(12) United States Patent
Landgraf

(10) Patent No.: US 10,810,966 B1
(45) Date of Patent: Oct. 20, 2020

(54) FUSION OF ELECTRONIC MIRROR SYSTEMS AND DRIVER MONITORING FOR INCREASED CONVENIENCE AND ADDED SAFETY

(71) Applicant: Ambarella International LP, Santa Clara, CA (US)

(72) Inventor: Jens Landgraf, Bloomfield Hills, MI (US)

(73) Assignee: Ambarella International LPCA (US)

( * ) Notice: Subject to any disclaimer, the term of this patent is extended or adjusted under 35 U.S.C. 154(b) by 0 days.

(21) Appl. No.: 16/247,899

(22) Filed: Jan. 15, 2019

(51) Int. Cl.
| | |
|---|---|
| *H04N 5/262* | (2006.01) |
| *H04N 5/232* | (2006.01) |
| *G06T 7/20* | (2017.01) |
| *G06T 7/70* | (2017.01) |
| *B60R 1/00* | (2006.01) |
| *G09G 5/00* | (2006.01) |
| *G06K 9/00* | (2006.01) |
| *G09G 5/10* | (2006.01) |
| *H04N 7/18* | (2006.01) |
| *G06F 3/14* | (2006.01) |

(52) U.S. Cl.
CPC ............ *G09G 5/003* (2013.01); *B60R 1/00* (2013.01); *G06F 3/1423* (2013.01); *G06K 9/00845* (2013.01); *G09G 5/10* (2013.01); *H04N 7/183* (2013.01); *B60R 2300/105* (2013.01); *B60R 2300/20* (2013.01); *B60R 2300/8046* (2013.01); *G09G 2320/0626* (2013.01); *G09G 2354/00* (2013.01); *G09G 2380/10* (2013.01)

(58) Field of Classification Search
CPC .. G09G 5/003; G09G 5/10; B60R 1/00; G06F 3/1423; G06K 9/00845; H04N 7/183
USPC ................................................ 348/78
See application file for complete search history.

(56) References Cited

U.S. PATENT DOCUMENTS

| | | | | |
|---|---|---|---|---|
| 10,116,873 | B1* | 10/2018 | Campbell | H04N 5/23296 |
| 2006/0164219 | A1* | 7/2006 | Knoll | B60K 35/00 |
| | | | | 340/435 |
| 2006/0282204 | A1* | 12/2006 | Breed | G01G 23/3728 |
| | | | | 701/49 |
| 2008/0276191 | A1* | 11/2008 | Breed | B60N 2/002 |
| | | | | 715/771 |
| 2010/0201816 | A1* | 8/2010 | Lee | B60R 1/12 |
| | | | | 348/148 |
| 2010/0241021 | A1* | 9/2010 | Morikawa | A61B 5/048 |
| | | | | 600/544 |
| 2012/0268262 | A1* | 10/2012 | Popovic | G08G 1/166 |
| | | | | 340/438 |
| 2014/0132527 | A1* | 5/2014 | Wu | H04N 5/23293 |
| | | | | 345/173 |

(Continued)

*Primary Examiner* — Zaihan Jiang
(74) *Attorney, Agent, or Firm* — Christopher P. Maiorana, PC

(57) ABSTRACT

An apparatus includes an interface and a processor. The interface may be configured to communicate video data to a display. The processor may be configured to receive video frames from a capture device, generate video data for the display in response to the video frames, perform operations to detect an object in the video frames and determine eye position information. The eye position information may be used to determine whether a driver is looking at the display. The processor may be configured to adjust content presented by the display when the driver is looking at the display.

19 Claims, 13 Drawing Sheets

(56) References Cited

U.S. PATENT DOCUMENTS

| | | | |
|---|---|---|---|
| 2014/0146152 A1* | 5/2014 | Frashure | H04N 7/188 |
| | | | 348/77 |
| 2016/0148050 A1* | 5/2016 | Lee | G06K 9/00604 |
| | | | 348/78 |
| 2017/0129405 A1* | 5/2017 | Oba | B60R 1/08 |
| 2017/0280024 A1* | 9/2017 | Murugesan | H04N 1/622 |
| 2017/0300162 A1* | 10/2017 | Jang | G06F 3/0416 |
| 2017/0343799 A1* | 11/2017 | Ito | G02B 27/0101 |
| 2018/0015825 A1* | 1/2018 | Nania | G08B 21/06 |
| 2018/0131877 A1* | 5/2018 | Amano | B60R 1/00 |
| 2019/0075253 A1* | 3/2019 | Wada | H04N 5/247 |
| 2019/0096359 A1* | 3/2019 | Uno | G09G 5/003 |
| 2019/0126824 A1* | 5/2019 | Oba | G02B 27/0101 |

* cited by examiner

US 10,810,966 B1

FUSION OF ELECTRONIC MIRROR SYSTEMS AND DRIVER MONITORING FOR INCREASED CONVENIENCE AND ADDED SAFETY

FIELD OF THE INVENTION

The invention relates to vehicle systems generally and, more particularly, to a method and/or apparatus for implementing fusion of electronic mirror systems and driver monitoring for increased convenience and added safety.

BACKGROUND

Around the world automotive original equipment manufacturers (OEMs) and Tier 1 suppliers are about to define system configurations enabling electronic mirror solutions. Definitions for e-mirror (or camera monitoring systems (CMS)) are put in place under ISO 16505:2015. Multiple displays can be used instead of one centralized display.

In case of e-mirror (or CMS) the video output displays have to be active all the time while driving in order to be a replacement for a reflective mirror. The e-mirror must be viable to use during day time and night time. E-mirrors can offer enhancements such as displaying notifications and warnings. However, notifications displayed on various displays might result in notifications being displayed when a driver is not looking at a particular display. The driver might overlook certain events or can be irritated by seeing too many alerts.

It would be desirable to implement fusion of electronic mirror systems and driver monitoring for increased convenience and added safety.

SUMMARY

The invention concerns an apparatus comprising an interface and a processor. The interface may be configured to communicate video data to a display. The processor may be configured to receive video frames from a capture device, generate video data for the display in response to the video frames, perform operations to detect an object in the video frames and determine eye position information. The eye position information may be used to determine whether a driver is looking at the display. The processor may be configured to adjust content presented by the display when the driver is looking at the display.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing fusion of electronic mirror systems and driver monitoring for increased convenience and added safety that may (i) track where a driver is looking, (ii) intelligently adapt notifications to a gaze direction of a driver, (iii) suppress notifications in response to a gaze direction of a driver, (iv) adapt a brightness of a display in response to a gaze direction in dark environments, (v) provide internal and external computer vision, (vi) detect objects around the vehicle and/or (vii) be implemented as one or more integrated circuits.

Embodiments of the present invention may be configured to adjust output to displays. Vehicles may be designed with multiple displays integrated. The displays may provide information and/or e-mirror solutions (e.g., left, right and center rear-view displays). Embodiments of the present invention may comprise implementing e-mirror systems enhanced with driver state monitoring (DSM) and/or driver monitoring systems (DMS). DSM and/or DMS may be used to detect a driver and/or detect and track a gaze direction of a driver. Embodiments of the present invention may further comprise computer vision (CV). Computer vision may be implemented in order to detect approaching vehicles and/or objects from behind in the field of view of the e-mirror system and alert/warn the driver.

Figure 1:
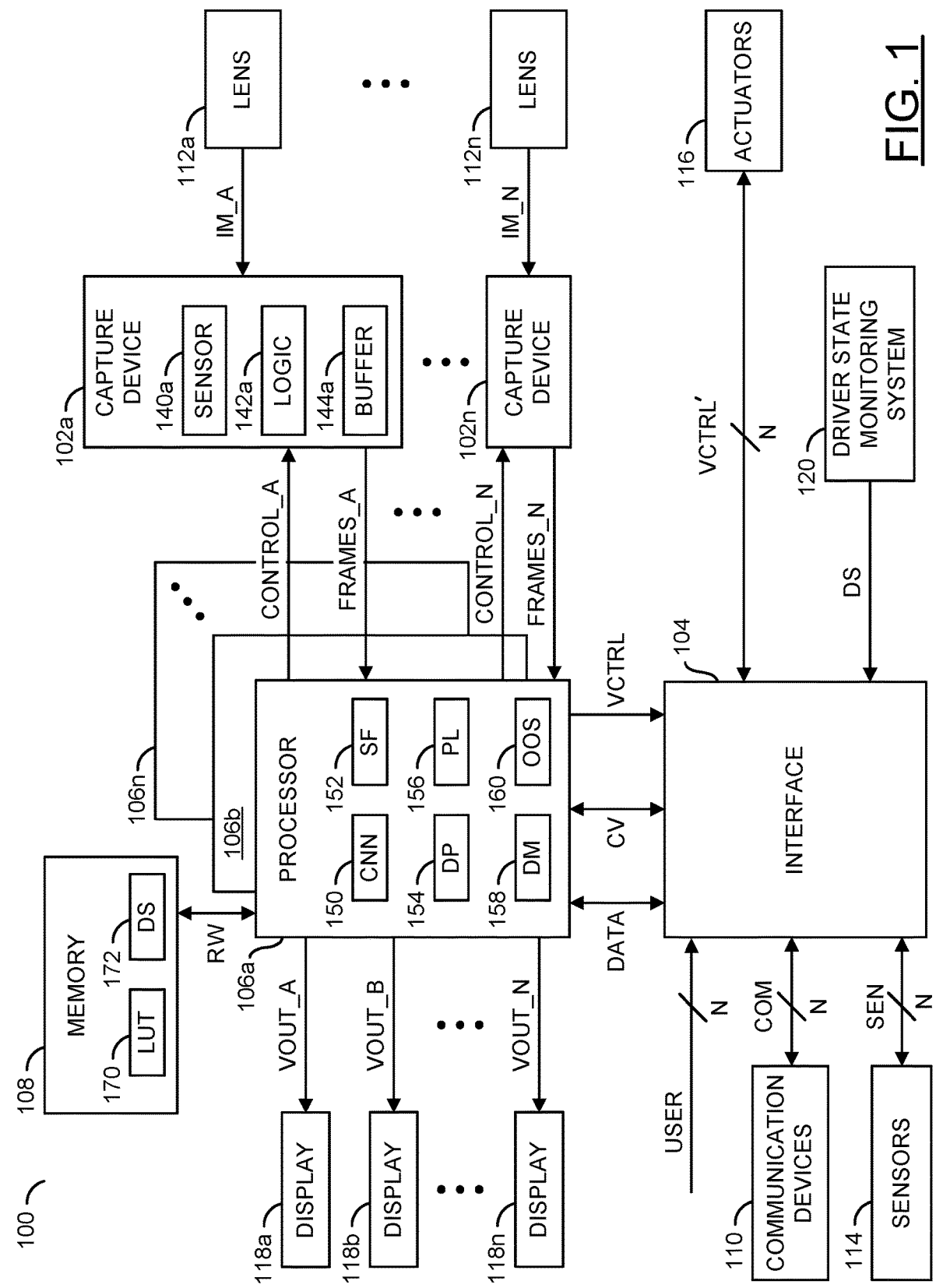
FIG. 1 is a diagram illustrating an embodiment of the present invention.

Referring to FIG. 1, a diagram illustrating an embodiment of the present invention 100 is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116, blocks (or circuit) 118a-118n and/or a block (or circuit) 120. The circuits 102a-102n may each implement a capture device. The circuits 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuits 118a-118n may each implement a display. The circuit 120 may implement a driver state monitoring system (DSM). The apparatus 100 may comprise other components (not shown). The number, type and/or arrangement of the components of the apparatus 100 may be varied according to the design criteria of a particular implementation.

In various embodiments of the apparatus 100, the components 102a-120 may be implemented as a distributed camera system 100. In the distributed system embodiment of the apparatus 100, each component may be implemented separately throughout an installation location (e.g., such as a vehicle). In some embodiments of the apparatus 100, the components 102a-120 may be implemented on a printed circuit board (e.g., a single module). In the single module embodiment, each component may be connected to a single module (e.g., such as a circuit board on a small device such as a drone). In some embodiments, some of the components 102a-120 may be implemented on a single module and some of the components 102a-120 may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle).

In some embodiments, the apparatus 100 may implement one of the processors 106a-106n. In some embodiments, the apparatus 100 may implement multiple processors 106a-106n. For example, the processors 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, the one or more of the components 102a-120 may be implemented as part of another one of the components 102a-120. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., one of the displays 118a-118n).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to receive a respective one of the signals IM_A-IM_N, a respective signal (e.g., CONTROL_A-CONTROL_N) and/or present a respective signal (e.g., FRAMES_A-FRAMES_N).

The capture devices 102a-102n may each be configured to generate images and/or video frames in response to the signals IM_A-IM_N (e.g., perform an analog to digital conversion). The capture devices 102a-102n may capture data received through the lenses 112a-112n to generate video image data (e.g., generate video frames). The signals FRAMES_A-FRAMES_N may comprise video frames and/or images generated by the capture devices 102a-102n (e.g., video data). In some embodiments, the capture devices 102a-102n may be configured to perform depth sensing (e.g., the signals FRAMES_A-FRAMES_N may comprise depth information and/or vector light data in addition to the video frames). In one example, the capture devices 102a-102n may perform depth sensing using stereo cameras (e.g., cameras configured as a stereo pair to capture a depth map). In another example, the capture devices 102a-102n may perform depth sensing using time-of-flight. In yet another example, the capture devices 102a-102n may perform depth sensing using structured light. The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL'), a signal (e.g., USER) and/or a signal (e.g., DS). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The signal DS may represent data corresponding to a driver state (e.g., a direction of a gaze of a driver, the sight line of the driver, the direction the driver is looking, etc.). The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL, signals (e.g., VOUT_A-VOUT_N) and/or send/receive the signal DATA, the signal CV and/or a signal (e.g., RW). The signals VOUT_A-VOUT_N may each provide a video data output to a corresponding one of the displays 118a-118n. For example, the processors 106a-106n may be configured to generate the video data (e.g., VOUT_A-VOUT_N) for the displays 118a-118n in response to the video frames (e.g., FRAMES_A-FRAMES_N). The signal RW may communicate data to/from the memory 108. The signals VOUT_A-VOUT_N, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170 and/or a block (or circuit) 172. The block 170 may implement a look up table. The block 172 may implement data storage. The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a LIDAR device, an array of LIDAR devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, etc. The actuators 116 may control various components of the host vehicle. The number, type and/or functionality of the actuators 116 may be varied according to the design criteria of a particular implementation.

The displays 118a-118n may be each implement a screen and/or an output device. In one example, one or more of the displays 118a-118n may implement an electronic mirror (e.g., an e-mirror). In another example, one or more of the displays 118a-118n may implement a touchscreen for an infotainment system. In yet another example, one or more of the displays 118a-118n may implement a back-up camera and/or bird's eye view camera. The displays 118a-118n may display a version of video frames captured by one or more of the lenses 112a-112n and/or the capture devices 102a-102n. The video frames captured by the capture device 102a-102n may be cropped, adjusted and/or encoded by the processors 106a-106n to fit the display 118a-118n. For example, the processor 106a-106n may provide real-time video streaming to the displays 118a-118n via the signals VOUT_A-VOUT_N.

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The logic 142a may transform the bitstream into a human-legible content (e.g., video data and/or video frames). For example, the logic 142a may receive pure (e.g., raw) data from the camera sensor 140a and generate video data based on the raw data (e.g., the bitstream). The logic 142a may further control the lens 112a in response to the signal CONTROL_A. The memory buffer 144a may store the raw data and/or the processed bitstream. For example, the frame memory and/or buffer 144a may store (e.g., provide temporary storage and/or cache) one or more of the video frames (e.g., the video signal). In some embodiments, each of the capture devices 102a-102n may comprise other components (e.g., a battery, a motor, a microphone, etc.).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection.

The sensor fusion module 152 may be configured to analyze information from multiple sensors 114, capture devices 102a-102n and/or the driver state monitoring system 120 for redundancy. By analyzing various data from disparate sources, the sensor fusion module 152 may be capable of making inferences about the data that may not be possible from one of the data sources alone. For example, the sensor fusion module 152 may analyze video data as well as radar, LIDAR, inertial, motion, V2X, location data (e.g., GPS, GNSS, ADAS, etc.), gaze direction, driver state and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by LIDAR for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing, downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection and/or high dynamic range processing. The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the displays 118a-118n (e.g., the signal VOUT_A-VOUT_N).

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn.

The decision making module 158 may utilize data from the CNN module 150 and/or computer vision data using a histogram oriented gradient (HOG). The sources of data for making decisions used by the decision making module 158 may be varied according to the design criteria of a particular implementation.

The decision making module 158 may be further configured to determine the video data to communicate to the displays 118a-118n. The signals VOUT_A-VOUT_N may be cropped and/or adjusted in response to decisions by the decision making module 158. For example, the decision module 158 may select one field of view (e.g., a wide angle field of view) instead of another field of view (e.g., a narrow angle field of view) to send to the display 118a as the signal VOUT_A. In another example, the decision making module 158 may determine which of the displays 118a-118n to use to display a notification. In yet another example, the decision making module 158 may adjust output characteristics of the displays 118a-118n (e.g., brightness).

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of a particular one of the displays 118a-118n by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the displays 118a-118n. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signals VOUT_A-VOUT_N may be encoded, cropped, stitched and/or enhanced versions of one or more of the signals FRAMES_A-FRAMES_N. The signals VOUT_A-VOUT_N may be high resolution, digital, encoded, de-warped, stabilized, cropped, blended, stitched and/or rolling shutter effect corrected versions of the signals FRAMES_A-FRAMES_N.

The driver state monitoring system 120 may be configured to monitor a driver of a vehicle. In one example, the DSM 120 may be configured to determine a direction of a gaze of the driver. The signal DS may be configured to communicate the driver state. In one example, the signal DS may comprise vector coordinates and/or spherical coordinates of the direction of the gaze of the driver.

In the example shown, the DSM 120 may be a component of the apparatus 100. In some embodiments, the DSM 120 may be a module of one or more of the co-processors 106a-106n. In some embodiments, the DSM 120 may be a component separate from the apparatus 100. Generally, the DSM 120 may comprise a lens and a capture device. In some embodiments, the DSM 120 may be configured to receive input from the capture devices 102a-102n (e.g., the signal FRAMES_A-FRAMES_N). The implementation of the DSM 120 may be varied according to the design criteria of a particular implementation. Details of the DSM 120 may be described in association with FIG. 5.

Figure 2:
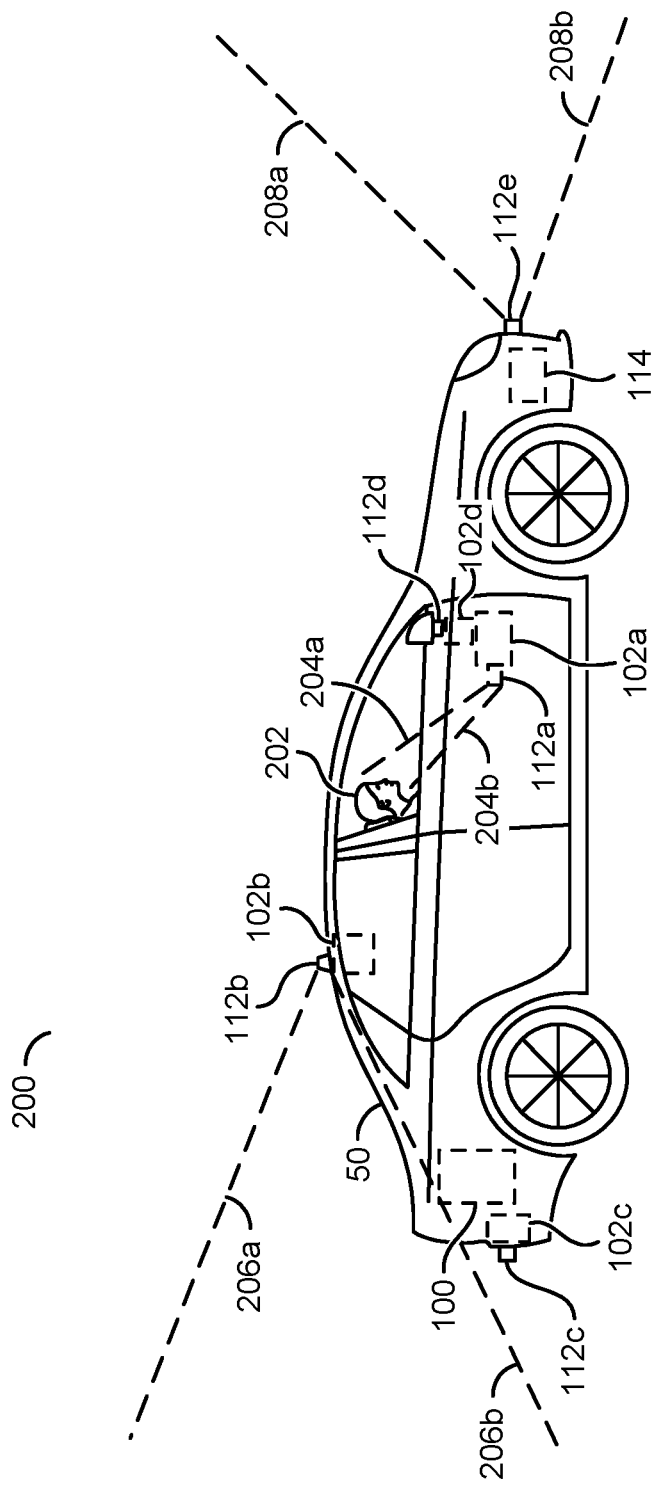
FIG. 2 is a diagram illustrating an example of camera systems inside and outside of a vehicle.

Referring to FIG. 2, an example embodiment 200 of camera systems inside and outside of a vehicle is shown. An automobile/vehicle 50 is shown. The apparatus 100 is shown as a component of the vehicle 50. In the example shown, the vehicle 50 is a car. In some embodiments, the vehicle 50 may be a truck, an ATV, an airplane, a drone, etc. The type of the vehicle 50 implementing the apparatus 100 may be varied according to the design criteria of a particular implementation.

A driver 202 is shown seated in the vehicle 50. The vehicle sensors 114 are shown on (or in) the vehicle 50. The apparatus 100 is shown in the rear of the vehicle 50. In another example, the apparatus 100 may be distributed throughout the vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the vehicle 50 (e.g., detecting the driver 202). A targeted view of the driver 202 (e.g., represented by a line 204a and a line 204b) is shown being captured by the capture device 102a. The capture device 102a may also detect other objects in the vehicle 50 (e.g., a seat, a head rest, an arm rest, a rear window, a seatbelt, a center console, other occupants, etc.). By analyzing video of the driver 202 and/or other occupants of the vehicle 50 (e.g., extracting video data from the captured video), the processors 106a-106n may determine a body position and/or body characteristics (e.g., a distance, orientation and/or location of the body and/or head) of one or more occupants of the vehicle 50 and/or objects within the vehicle 50.

In some embodiments, more than one of the capture devices 102a-102n may be used to capture video data of the driver 202 and/or other occupants of the vehicle 50. A combination of inputs from the signals FRAMES_A-FRAMES_N may be used by the DSM 120 to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112b and the capture device 102b) is shown capturing a targeted view from the vehicle 50. In the example shown, the targeted view from the vehicle 50 (e.g., represented by a line 206a and a line 206b) is shown capturing an exterior view to the rear of (e.g., an area behind) the vehicle 50. Similarly, other cameras may be used to capture video data of a targeted view from the vehicle (e.g., shown as the lens 112c and the camera sensor 102c, the lens 112d and the camera sensor 102d, etc.). For example, the targeted view (e.g., represented by a line 208a and a line 208b) may provide a front exterior view of an area. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the vehicle 50. The processors 106a-106n may implement computer vision to detect objects and/or understand what is happening near the vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a LIDAR device, an array of LIDAR devices, an ultra-sound device, an array of ultra-sound devices, etc.

The sensor fusion module 152 may aggregate data from the sensors 114, the DSM 120, the CNN module 150 and/or the video pipeline 156 to build a model and/or abstraction of the environment around the vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

Figure 3:
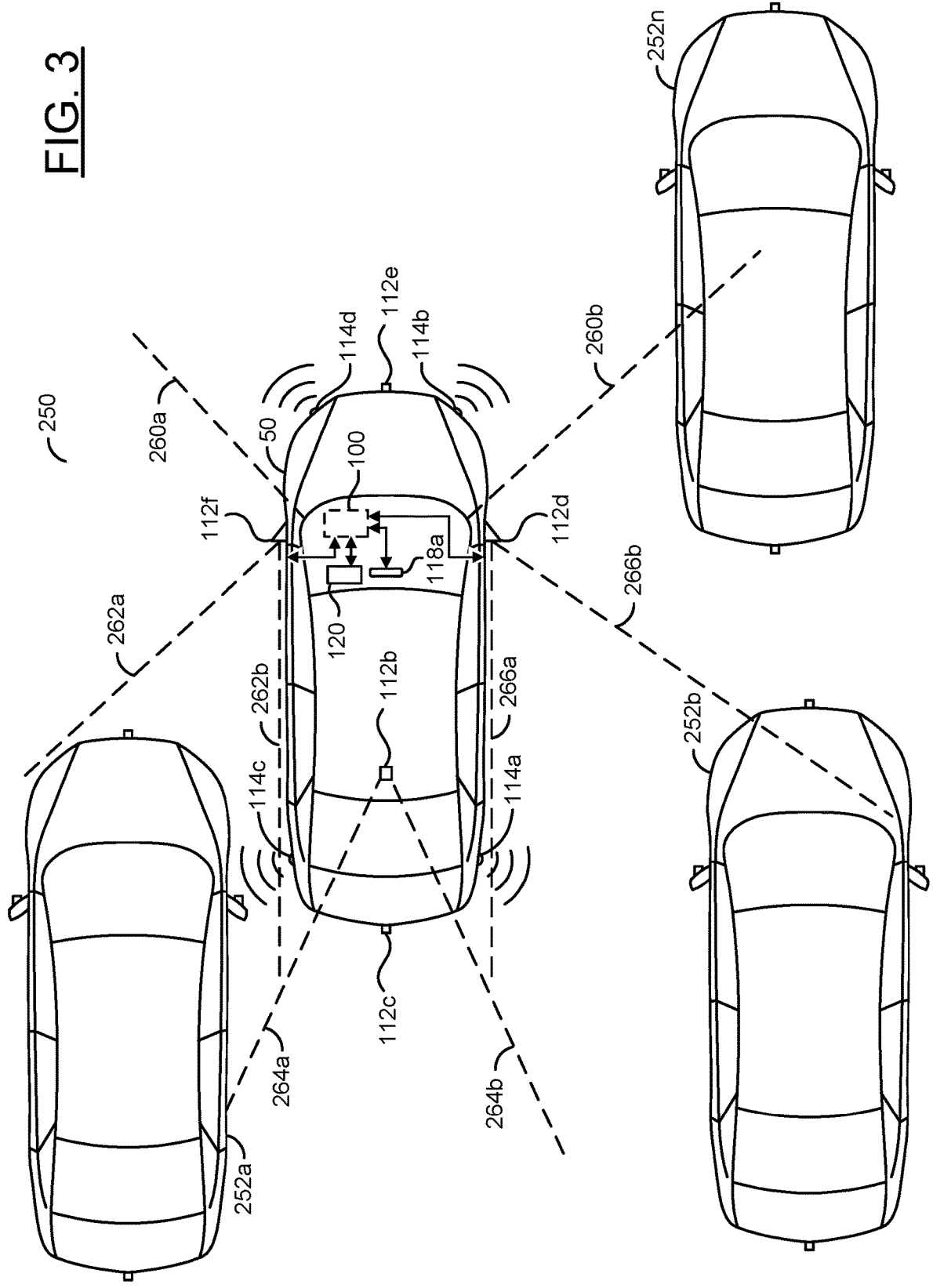
FIG. 3 is a diagram illustrating an overhead view of a vehicle in traffic.

Referring to FIG. 3, a diagram illustrating an overhead view 250 of the vehicle 50 in traffic is shown. The traffic may comprise other vehicles 252a-252n. The ego vehicle 50 is shown slightly ahead and to the right of the vehicle 252a and slightly ahead and to the left of the vehicle 252b. The ego vehicle 50 is shown slightly behind and to the left of the vehicle 252n.

The apparatus 100 is shown within the ego vehicle 50. In the example shown, the DSM 120 is within the ego vehicle 50 as a module separate from the apparatus 100. The lenses 112a-112f are shown on the ego vehicle 50. The sensors 114a-114d are shown located on the outside of the ego vehicle 50. The display 118a is shown within the ego vehicle 50. While only one of the displays 118a is shown as a representative example, generally the ego vehicle 50 may comprise more than one of the displays 118a-118n.

Each of the lenses 112a-112f may be directed to capture a different field of view. As shown in association with FIG. 2, the lens 112b may capture the field of view 206a-206b and the lens 112e may capture the field of view 208a-208b. In an example, each of the fields of view captured by the lenses 112a-112f may be presented as video data to the displays 118a-118n.

Dotted lines 260a-260b are shown extending from a windshield of the ego vehicle 50. The dotted lines 260a-260b may represent the field of view (e.g., the direction of the gaze) of the driver 202. The gaze 260a-260b may be a representative example of the gaze of the driver 202 when the driver 202 is looking forward out the windshield (e.g., looking out at the roadway and not looking at one of the displays 118a-118n). In one example, the DSM 120 may be configured to detect where the driver 202 is looking based on a determined field of view of the driver 202 and provide the gaze direction information to the processors 106a-106n as the signal DS. The processors 106a-106n may use the gaze direction information to determine the gaze 260a-260b.

The processors 106a-106n may use the gaze direction information to determine that the driver 202 is looking out the front windshield and determine the gaze 260a-260b. The processors 106a-106n may be further configured to perform computer vision operations on the video data captured using the lens 112e (which may provide an approximation of what the driver 202 may see in front of the ego vehicle 50). For example, the computer vision operations performed by the processors 106a-106n may be configured to detect that the vehicle 252n may be visible. The sensor fusion module 152 may be configured to combine the detection of the vehicle 252n from the video data captured using the lens 112e with a detection of objects using the proximity sensor 114b. The sensor fusion module 152 may be further configured to weight the information received from the computer vision operations. For example, since the vehicle 252n may be on the periphery of the gaze 260a-260b there may be an increased likelihood that the driver 202 may not notice the vehicle 252n, even though the vehicle 252n is within the current gaze direction 260a-260b of the driver 202. Based on the detections by the processors 106a-106n corresponding with the field of view of the lens 112e, the processors 106a-106n may be configured to infer what the driver 202 sees when looking out the windshield of the ego vehicle 50. In the example shown, the apparatus 100 may be configured to infer that when the driver 202 is looking out the front windshield, the driver 202 may have a chance to see the vehicle 252n and may not see the vehicles 252a-252b.

Dotted lines 262a-262b are shown extending from the lens 112f on the driver side of the ego vehicle 50. The dotted lines 262a-262b may represent the field of view (e.g., the direction of the gaze) of the driver 202. The gaze 262a-262b may be a representative example of the gaze of the driver 202 when the driver 202 is looking at one of the displays 118a-118n. For example, one of the displays 118a-118n (e.g., 118a) may display the video data captured using the lens 112f and when the driver 202 looks at the display 118a, the driver 202 may be able to see a rearward view from the driver side of the ego vehicle 50 (e.g., a view similar to and/or emulating using a reflective driver side mirror). In one example, the DSM 120 may be configured to detect where the driver 202 is looking and provide the gaze direction information to the processors 106a-106n as the signal DS.

The processors 106a-106n may use the gaze direction information to determine that the driver 202 is looking at one of the displays 118a-118n, determine the video data displayed (e.g., video data captured using the lens 112f) and determine the gaze 262a-262b. The processors 106a-106n may be further configured to perform computer vision operations on the video data captured using the lens 112f. For example, the computer vision operations performed by the processors 106a-106n may be configured to detect the vehicle 252a. The sensor fusion module 152 may be configured to combine the computer vision results from the processors 106a-106n with the proximity detection performed by the sensor 114c (e.g., radar, LIDAR, etc.). Based on the detections by the processors 106a-106n corresponding with the field of view of the lens 112f, the processors 106a-106n may be configured to infer what the driver 202 sees when looking at the display 118a. In the example shown, the apparatus 100 may be configured to infer that when the driver 202 is looking at the display 118a, the driver 202 may see the vehicle 252a, but not the vehicle 252b or the vehicle 252n.

Dotted lines 264a-264b are shown extending from the lens 112b on the roof of the ego vehicle 50. The dotted lines 264a-264b may represent the field of view (e.g., the direction of the gaze) of the driver 202. The gaze 264a-264b may be a representative example of the gaze of the driver 202 when the driver 202 is looking at one of the displays 118a-118n. For example, one of the displays 118a-118n (e.g., 118b) may display the video data captured using the lens 112b and when the driver 202 looks at the display 118b, the driver 202 may be able to see a rearward view from the ego vehicle 50 (e.g., a view similar to and/or emulating using a reflective rearview mirror). In one example, the DSM 120 may be configured to detect where the driver 202 is looking and provide the gaze direction information to the processors 106a-106n as the signal DS.

The processors 106a-106n may use the gaze direction information to determine that the driver 202 is looking at one of the displays 118a-118n, determine the video data displayed (e.g., video data captured using the lens 112b) and determine the gaze 264a-264b. The processors 106a-106n may be further configured to perform computer vision operations on the video data captured using the lens 112b. For example, the computer vision operations performed by the processors 106a-106n may be configured to detect that no objects are visible to the rear of the vehicle. The sensor fusion module 152 may be configured to combine the lack of detection of objects from the video data captured using the lens 112b with a lack of detection of objects using proximity sensors. Based on the detections by the processors 106a-106n corresponding with the field of view of the lens 112b, the processors 106a-106n may be configured to infer what the driver 202 sees when looking at the display 118b. In the example shown, the apparatus 100 may be configured to infer that when the driver 202 is looking at the display 118b, the driver 202 may not see any of the vehicles 252a-252n.

Dotted lines 266a-266b are shown extending from the lens 112d on the passenger side of the ego vehicle 50. The dotted lines 266a-266b may represent the field of view (e.g., the direction of the gaze) of the driver 202. The gaze 266a-266b may be a representative example of the gaze of the driver 202 when the driver 202 is looking at one of the displays 118a-118n. For example, one of the displays 118a-118n (e.g., 118c) may display the video data captured using the lens 112d and when the driver 202 looks at the display 118c, the driver 202 may be able to see a rearward view from the passenger side of the ego vehicle 50 (e.g., a view similar to and/or emulating using a reflective passenger side mirror). In one example, the DSM 120 may be configured to detect where the driver 202 is looking and provide the gaze direction information to the processors 106a-106n as the signal DS.

The processors 106a-106n may use the gaze direction information to determine that the driver 202 is looking at one of the displays 118a-118n, determine the video data displayed (e.g., video data captured using the lens 112d) and determine the gaze 266a-266b. The processors 106a-106n may be further configured to perform computer vision operations on the video data captured using the lens 112d. For example, the computer vision operations performed by the processors 106a-106n may be configured to detect the vehicle 252b. Since the vehicle 252b is far away from the ego vehicle 50, the proximity sensor 114a may not be able to detect the vehicle 252b. The sensor fusion module 152 may be configured to combine the computer vision results from the processors 106a-106n with the lack of proximity detection performed by the sensor 114a (e.g., radar, LIDAR, etc.). For example, the sensor fusion module 152 may be configured to weight the information provided by each sensor (e.g., a confidence level of the computer vision detection, a confidence level of the detection of the sensor 114a, the distance limitations of the sensor 114a, whether the computer vision detects the vehicle 252b at a distance beyond the range of the sensor 114a, etc.). Based on the detections by the processors 106a-106n corresponding with the field of view of the lens 112d, the processors 106a-106n may be configured to infer what the driver 202 sees when looking at the display 118c. In the example shown, the apparatus 100 may be configured to infer that when the driver 202 is looking at the display 118c, the driver 202 may or may not see the vehicle 252b and may not see the vehicle 252a or the vehicle 252n.

The processors 106a-106n may be configured to detect events. The event may be information that warrants being brought to the attention of the driver 202. For example, whether a detected scenario is considered an event may be determined by the decision module 158. In one example, the event may corresponding to detecting that one of the vehicles 252a-252n may be on a collision course with the ego vehicle 50. The events may be detected based on the computer vision operations performed on the video data captured using the lenses 112a-112n. The events may be detected based on readings from the sensors 114a-114n. For example, the sensor fusion module 152 may be configured to combine information determined using the computer vision operations and information detected using the sensors 114a-114n to make inferences that may be used by the decision module 158.

In one example, the mere presence of the vehicles 252a-252n may not be enough to be considered an event. However, when one or more of the vehicles 252a-252n are too close to the ego vehicle 50 and/or are on a collision course with the ego vehicle 50 (e.g., a crash is imminent without corrective actions), then one or more of the vehicles 252a-252n may be considered an event. In the example shown, the vehicle 252b and the vehicle 252n may be considered to be far away and unlikely to collide with the ego vehicle 50 (e.g., non-events). In the example shown, the vehicle 252a may be close and/or approaching the ego vehicle 50 and may be a concern to the driver (e.g., the vehicle 252a may be considered an event because the vehicle 252a may be approaching the ego vehicle 50 or because if the driver 202 changes lanes the ego vehicle 50 would collide with the vehicle 252a). In some embodiments, the mere presence of a detected object may considered an event. In one example, if an emergency vehicle is detected (e.g., ambulance, police car, etc.), the decision module 158 may determine that there is an event. In another example, if there is a pothole, a spill, an accident, a school bus, a towing vehicle on the shoulder, etc. the decision module 158 may determine that there is an event. In yet another example, local laws and/or regulations may define what should be considered an event. The type of detection(s) that the decision module 158 may consider an event may be varied according to the design criteria of a particular implementation.

The processors 106a-106n may be configured to generate a notification in response to the detected event. The notification may be displayed on one or more of the displays 118a-118n. For example, when the decision module 158 determines that an event has been detected the processors 106a-106n may generate the notification as part of (or alongside) one or more of the signals VOUT_A-VOUT_N. In one example, the notification may be overlaid on top of the video data displayed on the displays 118a-118n.

In some embodiments, the notifications may be displayed when the processors 106a-106n determine that the driver 202 is not looking at the detected event. In an example, if the decision module 158 determines that the detection of the vehicle 252n is an event, and the processors 106a-106n determine that the gaze of the driver 202 is the gaze direction 262a-262b (e.g., the driver 202 is looking at the display 118a), then the notification may be displayed on the display 118a (e.g., since the driver 202 would not see the vehicle 252n on the display 118a). In another example if the decision module 158 determines that the detection of the vehicle 252a is an event, and the processors 106a-106n determine that the gaze of the driver 202 is the gaze direction 262a-262b (e.g., The driver 202 is looking at the display 118a), then the notification may be suppressed (e.g., since the driver 202 would already see the vehicle 252a on the display 118a). In some embodiments, the notification may be displayed even when the driver 202 is determined to be looking at the event.

When the driver 202 is looking at one of the displays, the processors 106a-106n may assume that the field of view of the video data may be what the driver 202 sees. For example, if the driver 202 is looking at the display 118a and the display 118a is displaying the video data captured by the lens 112f, then the processors 106a-106n may consider that the video data captured using the lens 112f is the field of view of the gaze of the driver 202 (e.g., the gaze 262a-262b may be the same as the field of view of the lens 112f). Similarly, if the driver 202 is determined to be looking out the windshield, then the gaze 260a-260b may be assumed by the processors 106a-106n to correspond to the field of view of the lens 112e. For example, objects detected in the video data captured using the lens 112f may be considered to have been seen by the driver 202 when looking at the display 118a that is displaying the video data corresponding to the lens 112f.

Figure 4:
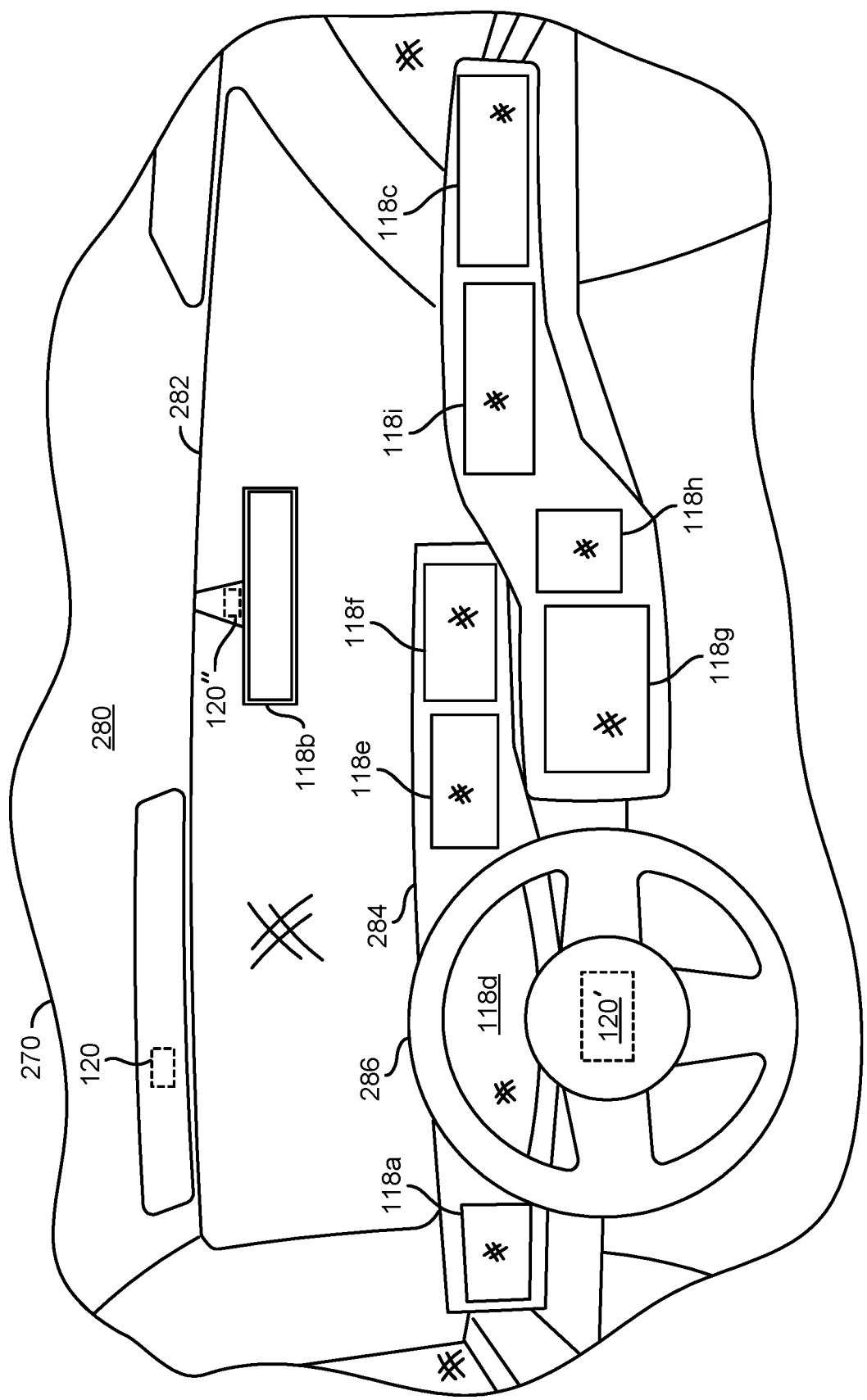
FIG. 4 is a diagram illustrating an interior of a vehicle from the perspective of a driver.

Referring to FIG. 4, a diagram illustrating an interior of the ego vehicle 50 from the perspective of the driver 202 is shown. A perspective 270 is shown. The perspective 270 may be a representation of a view of an interior 280 of the ego vehicle 50. The perspective 270 may generally provide a view of the interior 280 from the location and direction of the driver 202 but may not be what the driver 202 would actually see (e.g., may not be representative of the gaze direction 260a-260b).

The interior 280 of the ego vehicle 50 may comprise a windshield 282, a dashboard 284 and/or a steering wheel 286. A number of the displays 118a-118n are shown. In the example shown, the nine displays 118a-118i are shown. However, the number of the displays 118a-118n available in the ego vehicle 50 may be varied according to the design criteria of a particular implementation. The DSM 120 is shown. The DSM 120 is shown as part of the roof of the interior 280. The DSM 120 may comprise one of the capture devices 102a-102n and/or the lenses 112a-112n. Alternate locations for the DSM 120 are shown (e.g., the DSM 120' located on the steering wheel 286 and the DSM 120" located on the mount for the display 118b). Generally, the DSM 120 may be located to capture a view of the driver 202. The number and/or locations of the DSM 120 may be varied according to the design criteria of a particular implementation.

In the example shown, the display 118a may be located on the dashboard 284 to the left of the steering wheel 286. For example, the display 118a may be configured to display video data corresponding to the rear view from the driver side (e.g., emulating a driver side reflective mirror). In the example shown, the display 118b may be located at the top of the windshield 282. For example, the display 118b may be configured to display video data corresponding to the rear view (e.g., emulating a traditional reflective rearview mirror). In the example shown, the display 118c may be located on the dashboard 284 to the far right of the interior 280. For example, the display 118c may be configured to display video data corresponding to the rear view from the passenger side (e.g., emulating a passenger side reflective mirror). Similarly, the display 118d may be located on the dashboard 286 behind the steering wheel 286, and the displays 118e-118i may be located on the dashboard 284 at various locations to the right of the steering wheel 286. In one example, one or more of the displays 118d-118i may be configured to display vehicle information (e.g., warning icons, speed, distance, temperature, odometer, etc.). In another example, one or more of the displays 118d-118i may be configured as an infotainment touchscreen display (e.g., providing a user interface for audio, navigation, hands-free phone communication, etc.).

The processors 106a-106n may be configured to communicate any of the signals VOUT_A-VOUT_N to any of the displays 118a-118i. In an example, the user interface of the infotainment touchscreen (e.g., one of the displays 118a-118n) may be configured to enable the driver 202 (or a passenger in the ego vehicle 50) to customize the video output for each of the displays 118a-118n. In one example, the processors 106a-106n may enable one or more of the displays 118a-118n to duplicate a view. For example, the display 118a and the 118i may both display the rear view from the driver side emulating a driver side reflective mirror (e.g., to allow a driving instructor in the passenger seat to easily see the rear view from the passenger side). In another example, the processors 106a-106n may enable the driver 202 to select which of the displays 118a-118i display which video data. For example, the driver 202 may prefer to have the display 118e display the passenger side rear view instead of the display 118c, which is farther away.

Figure 5:
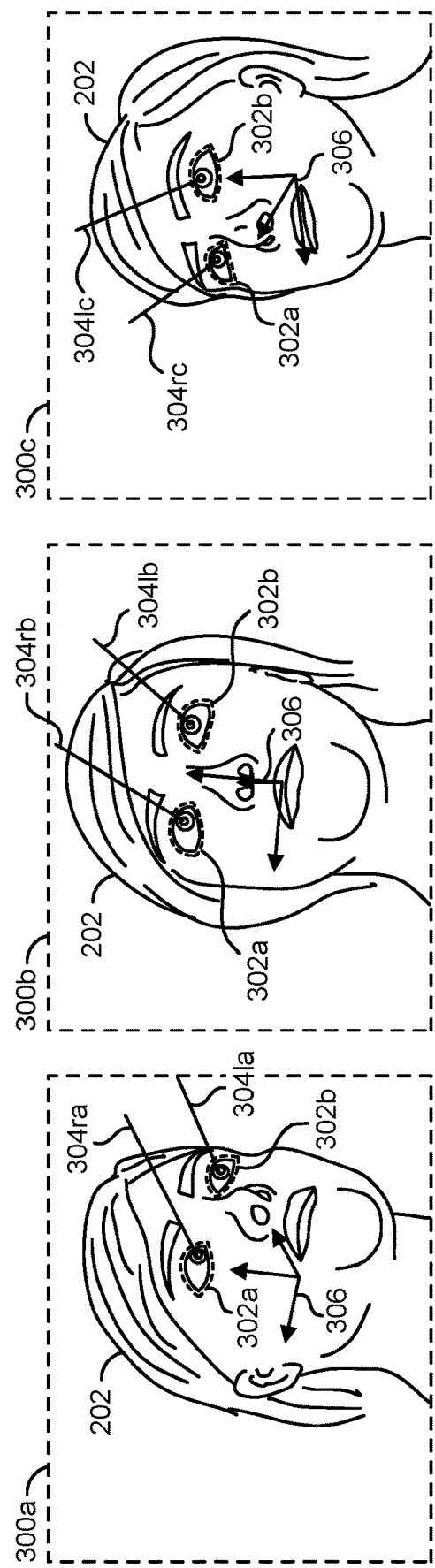
FIG. 5 is a diagram illustrating tracking a gaze of a driver.

Referring to FIG. 5, a diagram illustrating tracking a gaze of the driver 202 is shown. Video frames 300a-300c are shown. The video frames 300a-300c may represent video frames of the driver 202 analyzed by the DSM 120. In an example, the DSM 120 may receive the video frames 300a-300c from one or more of the capture devices 102a-102n (e.g., the video frames 300a-300c may correspond to the signals FRAMES_A-FRAMES_C). In one example, the video frames 300a-300c may be a sequence of video frames (e.g., the video frame 300a may be captured first, then the video frame 300b and then the video frame 300c). In another example, the video frames 300a-300c may be multiple video frames capturing the driver 202 simultaneously (e.g., the video frames 300a-300c may have the same time stamp). In the example shown, three of the capture devices 102a-102c may each capture a different angle of the driver 202 at the same time and the resulting video frames 300a-300c may be presented to the DSM 120 for analysis.

A view of the head and face of the driver 202 is shown in each of the video frames 300a-300c. Dotted lines 302a-302b are shown around the eyes of the driver. The DSM 120 may be configured to detect the location of the eyes of the driver 202. The dotted lines 302a-302b may represent the eyes of the driver 202 that have been detected by the DSM 120.

Lines 304ra-304rc and lines 304la-304lc are shown. The lines 304ra-304rc are shown extending from the right eye 302a of the driver 202 in each of the video frames 300a-300c. The lines 304la-304lc are shown extending from the left eye 302b of the driver 202 in each of the video frames 300a-300c. The lines 304ra-304rc may represent the direction that the right eye 302a is pointed. The lines 304la-304lc may represent the direction that the left eye is pointed.

An axis 306 is shown in each of the video frames 300a-300c. The axis 306 may be a reference (e.g., not actually visible in the captured image). The axis 306 may be illustrated to indicate the direction that the driver 202 is facing. The axis 306 may be used by the DSM as a reference location for determining a location of the eyes 302a=302b and/or the direction of the gaze in three dimensions.

The DSM 120 may be configured to use computer vision to locate the eyes 302a-302c in each of the video frames 300a-300c. In an example, the DSM 120 may be configured to determine the 3D coordinates of the location of the eyes 302a-302c with respect to the axis 306. For example, the coordinates may comprise a location with respect to a horizontal axis, a vertical axis and a depth axis (e.g., a location in 3D space). In some embodiments, the capture devices 102a-102n may implement depth sensing technology (e.g., time of flight) to determine a depth. In some embodiments, the capture devices 102a-102n may be configured as a stereo pair to determine depth information. The coordinates may be determined with respect to a position of the location of the capture devices 102a-102n.

Based on coordinates of the location of the eyes 302a-302b, the DSM 102 may be configured to determine the direction of the right eye 304ra-304rc and the direction of the left eye 304la-304lc in each of the video frames 300a-300c. The direction of the right eye 304ra-304rc and the direction of the left eye 304la-304lc may be determined based on the orientation of the face of the driver 202. In some embodiments, the DSM 120 may be configured to detect other facial features (e.g., the nose, the mouth, the ears, etc.) to determine which direction the driver 202 is facing. In some embodiments, the DSM 120 may be configured to determine the direction that the eyes 302a-302b are facing based on the relationship between the location of the eyes 302a-302b. In some embodiments, the DSM 120 may detect the location of the pupils of the eyes 302a-302b to determine the direction of the right eye 304ra-304rc and the direction of the left eye 304la-304lc.

The DSM 120 may be configured to compare the directions of the right eye 304ra-304rc determined from each of the video frames 300a-300c. The DSM 120 may be configured to compare the directions of the left eye 304la-304lc determined from each of the video frames 300a-300c. The comparison may provide multiple data points for accurately determining the direction of the gaze of the driver 202. In the example shown, three different video frames 300a-300c are used. In another example, one video frame may be used. In yet another example, more than three video frames may be used. Generally, more video frames for analysis may provide more data points, which may provide a more accurate result. However, more data may result in increased costs due to more of the capture devices 102a-102n installed. The number of video frames used for comparison to determine the direction of the gaze of the driver 202 may be varied according to the design criteria of a particular implementation.

Once the gaze of the driver 202 is determined by the DSM 120, the DSM 120 may present the signal DS. The signal DS may be analyzed by the processors 106a-106n. The processors 106a-106n and/or the memory 108 may store information about the interior 280 of the ego vehicle 50. For example, the information about the interior 280 may provide coordinates of the locations of the displays 118a-118n. The sensors 114 may further provide the signal SEN, which may comprise the distance of the seats from the dashboard 284. The sensor fusion module 152 may combine multiple data sources to make inferences about where the driver is located. The processors 106a-106n may determine the location of the driver within the interior 280.

The processors 106a-106n may be configured to map the gaze determined by the DSM 120 to a location. For example, the information about the interior 280 may be cross-referenced to the gaze of the driver 202. Based on the location of the driver 202, the direction of the gaze of the driver 202 and the configuration of the interior 280 of the ego vehicle 50 (e.g., prior knowledge of the layout of the interior 280), the processors 106a-106n may determine at what and/or where the driver 202 is looking. In one example, the processors 106a-106n may determine that the driver 202 is looking out of the windshield 282. In another example, the processors 106a-106n may determine that the driver 202 is looking at one of the displays 118a-118n. The processors 106a-106n may be configured to project the direction of the gaze of the driver 202 from the location driver 202 to a target location within and/or outside of the ego vehicle 50. Using prior knowledge of the interior 280 of the ego vehicle 50, the processors 106a-106n may infer what the driver 202 is viewing at the target location of the gaze.

Figure 6:
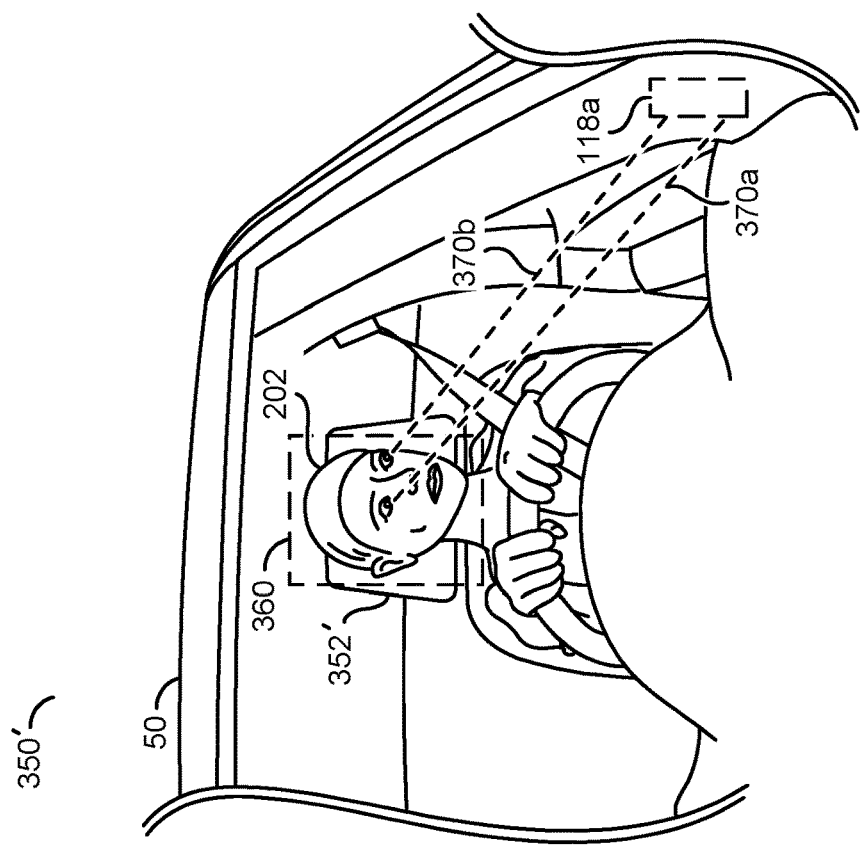
FIG. 6 is a diagram illustrating detection of body position, head position and head rotation.
Figure 6:
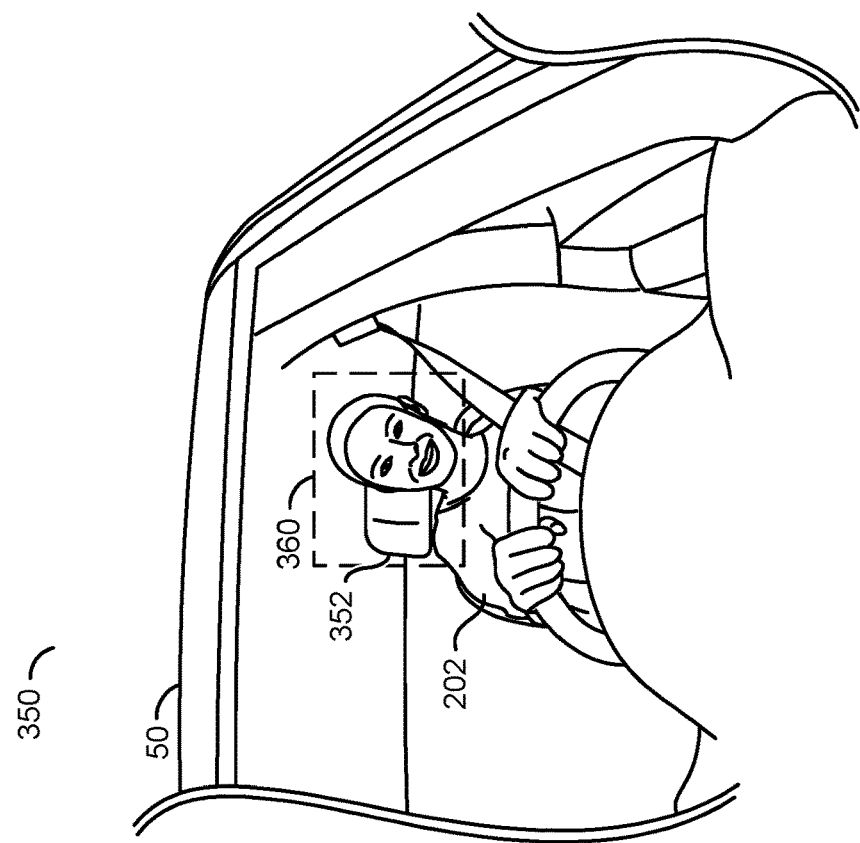

Referring to FIG. 6, a diagram illustrating detection of body position, head position and head rotation is shown. Example video frames 350 and 350' are shown. The video frames 350 and 350' may correspond to video data captured using the capture device 102a and/or the lens 112a directed towards the driver 202 (as shown in association with FIG. 2).

The driver 202 is shown in the video frame 350. A headrest 352 is shown behind the head of the driver 202. A dotted box 360 is shown. The dotted box 360 may represent a detection of the head of the driver 202 using the computer vision operations performed by the CNN module 150.

The driver 202 is shown leaning to the left. The target of the gaze of the driver 202 may change based on the position of the detected head 360. For example, the target of the gaze may be different when a person is leaning over compared to when sitting upright. In one example, the DSM 120 may be configured to determine the direction of the gaze of the driver 202 and provide the signal DS to the processors 106a-106n. The processors 106a-106n may use the information about the gaze of the driver 202 from the signal DS and the determined position of the detected head 360 of the driver 202 to map the direction of the gaze of the driver 202 to a target. In the example shown, the driver 202 may be looking forward out the windshield 282.

The processors 106a-106n may be configured to extract the body position of the driver 202 from the video frame 350. For example, the CNN module 150 may perform the video analytics based on machine learning. In the example shown, the detected head 360 may be a representative example of detections performed by the CNN module 150 corresponding to the driver 202. Other portions of the body of the driver 202 may be detected to determine the body position of the driver 202 (e.g., the orientation of the shoulders, the rotation and/or tilt of the head, the neck, the position of the hands, etc.).

The processors 106a-106n may be configured to detect the position of the detected head 360 based on an object of known size (e.g., a reference object). In the example shown, the headrest 352 may be the reference object. For example, the memory 108 may store the information about the interior 280 of the ego vehicle 50. The information may comprise a number of pixels of a video frame that the headrest 352 occupies at one or more distances from the capture device 102a. Based on the number of pixels in the video frame 350 that are occupied by the headrest 352, the distance of the headrest 352 from the capture device 102a may be determined by the processors 106a-106n. In one example, knowledge of human anatomy (e.g., size and shape of the head of an average person) may be used to approximate how far away the eyes of the driver 202 are from the headrest 352, which may then be used to determine the distance from the capture device 102a. In another example, a horizontal distance from the headrest 352 to the detected head 360 may be used to determine how far the head 360 has been tilted. The processors 106a-106n may be configured to model a relationship between the detected head 360 and/or other body parts of the driver 202 and the various objects in the interior 280 of the ego vehicle 50 to determine the gaze target of the driver 202.

The video frame 350' may show the driver 202 rotating the head and/or gaze towards the display 118a. The display 118a may be the e-mirror display built into the dashboard 284. In the example shown, the dotted box 360 may be the detected head of the driver 202. The processors 106a-106n may determine that the detected head 360 is closer to the capture device 102a than in the example video frame 350. For example, in the example video frame 350', the headrest 352' is shown larger. Since the headrest 352' is larger in the example video frame 350' (e.g., occupies a larger number of pixels of the video frame), the processors 106a-106n may infer that the headrest 352' and, by inference, the detected head 360 may be closer to the capture device 102a than the detected head 360 shown in the example video frame 350. The processors 106a-106n may further determine that the detected head 360 is rotated to the left. The location and/or position of the detected head 360 may be used to determine the target of the gaze of the driver 202.

Dotted lines 370a-370b are shown. The dotted lines 370a-370b may represent the projected gaze of the driver 202 (e.g., a projected field of view determined based on the eye position). The projected gaze 370a-370b may be the line of sight from the position of the head 360 of the driver 202 based on the gaze direction determined from the eyes 302a-302b. The projected gaze 370a-370b may be directed towards a target (e.g., the eyes 302a-302b may be a start location of the gaze projection 370a-370b and the target may be an end location of the gaze projection 370a-370b). In the example shown, the target of the gaze projection 370a-370b may be the display 118a.

In one example, the DSM 120 may be configured to detect the gaze information (e.g., the right eye gaze direction 304ra-304rc and the left eye gaze direction 3041a-3041c) but may not have information corresponding to the location of the driver 202 within the interior 280 of the ego vehicle 50 or knowledge of the location of objects within the interior 280 (e.g., the location of the displays 118a-118n). The signal DS may provide the gaze information to the processors 106a-106n. The processors 106a-106n may determine the location of the driver 202 (e.g., the location, rotation, direction, etc. of the detected head 360). The processors may use the gaze information from the signal DS to determine the gaze projection 370a-370b. The gaze projection 370a-370b may be combined with the information about the ego vehicle 50 to determine what the driver 202 is looking at (e.g., the target). For example, the gaze target may be one of the displays 118a-118n, outside the windshield 282, etc.

In another example, the DSM 120 may be configured to detect the gaze information (e.g., the right eye gaze direction 304ra-304rc and the left eye gaze direction 3041a-3041c) and may further have information corresponding to the location of the driver 202 within the interior 280 of the ego vehicle 50 or knowledge of the location of objects within the interior 280 (e.g., the location of the displays 118a-118n). The DSM 120 may combine the gaze direction with the location of the driver 202 (e.g., the location, rotation, direction, etc. of the detected head 360) to determine the gaze projection 370a-370b. The DSM 120 may combine the gaze projection 370a-370b with the information about the interior 280 of the ego vehicle 50 to determine the target of the gaze.

In an example, the DSM 120 may determine the gaze direction of the eyes 302a-302b as a set of angles for the right eye 302a (e.g., $\theta r$, $\varphi r$) and a set of angles for the left eye 302b (e.g., $\theta l$, $\varphi l$). The processors 106a-106n may determine that the detected head 360 is located at a 3D coordinate (e.g., X1,Y1,Z1). The processors 106a-106n may determine the projected gaze 370a-370b by starting at the location (X1,Y1,Z1) and extending the projection in the directions defined by the set of angles ($\theta r$, $\varphi r$ and $\theta l$, $\varphi l$). The processors 106a-106n may determine an intersection of the projected gaze 370a-370b with a location of a component of the interior 280 (e.g., an endpoint of the gaze X2,Y2,Z2) and/or a location beyond the windshield 284 to determine what the driver 202 is looking at.

In the example shown, the gaze projection 370a-370b is shown as a set of straight lines. The straight lines may be a representative example of the gaze projection 370a-370b. For example, the gaze projection 370a-370b may be comprised of a field of view for each of the eyes 302a-302b. Each of the eyes 302a-302b may see an area (e.g., a field of view) in front of the driver 202. The eye position information may comprise a direction of the field of view of the driver 202. The size of the field of view of the gaze projection 370a-370b may be approximated based on human anatomy (e.g., statistical information about fields of view of people).

Figure 7:
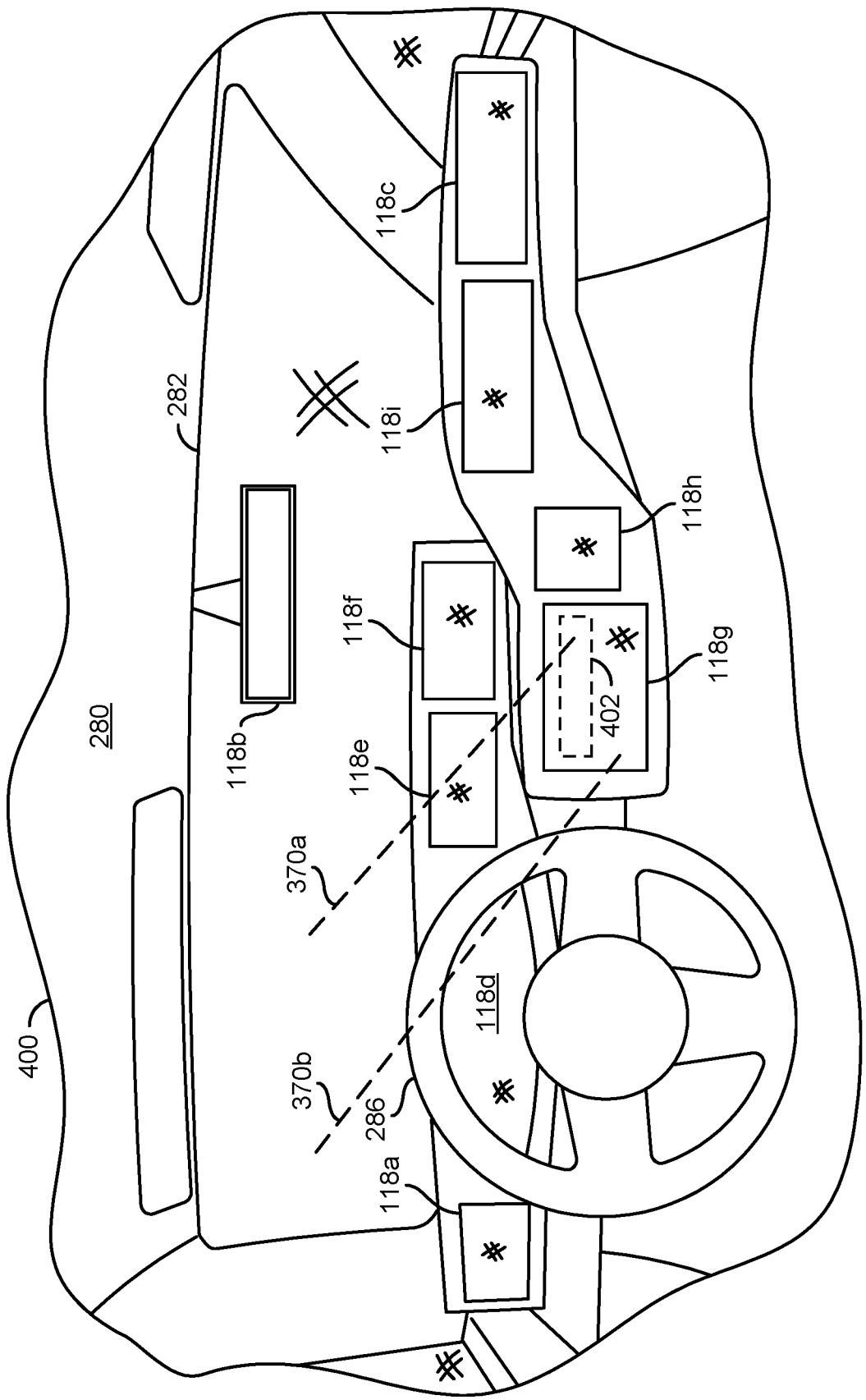
FIG. 7 is a diagram illustrating adjusting content presented by a display when the driver is looking at the display using a notification.

Referring to FIG. 7, a diagram illustrating adjusting content presented by a display when the driver is looking at the display using a notification is shown. A perspective 400 is shown. The perspective 400 may be a representation of a view of an interior 280 of the ego vehicle 50 during the day time (e.g., bright outside). The perspective 400 may generally provide a view of the interior 280 from the location and direction of the driver 202 but may not be what the driver 202 would actually see (e.g., may not be representative of the gaze direction 260a-260b).

The interior 280 of the ego vehicle 50 is shown. The interior 280 may comprise the windshield 282, the dashboard 284, the steering wheel 286 and/or the displays 118a-118i. The gaze projection 370a-370b is shown. In the example shown, the gaze projection 370a-370b may start from a location in front of the steering wheel 286 (e.g., generally where the driver 202 would be sitting), and the gaze projection 370a-370b may end at the display 118g. The display 118g may be the target of the gaze of the driver 202. In the example shown, the display 118g is shown near a cluster of displays (e.g., the display 118e, the display 118f, the display 118g and the display 118h). The processors 106a-106n may be configured to determine a most likely one of the displays (e.g., the display 118g) that the driver 202 is looking at within the interior 280 of the ego vehicle 50. The most likely display may be determined based on the eye position information (e.g., the direction of the field of view) and/or the gaze projection 370a-370b.

A dotted box 402 is shown on the display 118g. The dotted box 402 may represent an adjustment to the video output of the display 118g. In one example, the adjustment 402 may be a notification (e.g., a visual alert). The processors 106a-106n may be configured to adjust the content of one or more of the displays 118a-118n using the notification 402 when the driver 202 is looking at a particular one of the displays 118a-118n. In the example shown, the notification 402 is shown on the display 118g and the other displays (e.g., 118a-118f and 118h-118l) may not display any notification.

The notification 402 may be communicated as part of the signal VOUT_G generated by the processors 106a-106n. For example, the processors 106a-106n may generate a sequence of video frames with the notification 402 overlaid on the video data and the display 118g may display the video frames with the notification 402. In another example, the processors 106a-106n may generate the notification separate from the video data. The processors 106a-106n may communicate the video data and the video data may be displayed by the display 118g. The processors 106a-106n may communicate the notification 402 separate from the video data to the display 118g. The display 118g may be configured to display the video frames and overlay the notification 402 on the displayed video frames. The size and/or shape of the notification 402 may be adapted to the size of the selected display (e.g., the notification may be smaller, or be displayed as an icon on the smaller display 118b). The communication and/or display of the notification 402 may be varied according to the design criteria of a particular implementation.

The processors 106a-106n may determine the target of the projected gaze 370a-370b to infer what the driver 202 is looking at. In an example, if the target of the projected gaze 370a-370b is out through the windshield 282, then the processors 106a-106n may determine that the driver 202 has the gaze direction 260a-260b (shown in association with FIG. 3 as a front view).

In the example shown, the projected gaze 370a-370b may be targeted at the display 118g. The processors 106a-106n may have prior knowledge of what is being displayed on the display 118g (e.g., the signal VOUT_G). Based on what is displayed on the display 118g, the processors 106a-106n may infer what the driver 202 is looking at. In one example, if the display 118g is displaying the video data captured by the lens 112f, then the processors 106a-106n may determine that the driver 202 has the gaze direction 262a-262b (shown in association with FIG. 3 as the driver side rear view). In another example, if the display 118g is displaying the video data captured by the lens 112b, then the processors 106a-106n may determine that the driver 202 has the gaze direction 264a-264b (shown in association with FIG. 3 as the rear view). In yet another example, if the display 118g is displaying the video data captured by the lens 112d, then the processors 106a-106n may determine that the driver 202 has the gaze direction 266a-266b (shown in association with FIG. 3 as the passenger side rear view).

The processors 106a-106n may be configured to implement computer vision operations to detect objects exterior to the ego vehicle 50. In one example, the objects may be the vehicles 252a-252n. In another example, the objects may be road signs, the road layout, pedestrians and/or obstacles (e.g., medians, trees, buildings, etc.). Generally, the computer vision operations used with the interior-directed capture devices for detecting the eyes and/or head of the driver 202 may be similarly used with the exterior-directed capture devices for detecting the objects (e.g., different detection libraries may be implemented). The types of objects detected may be varied according to the design criteria of a particular implementation. When the processor 106a-106n determines that one of the detected objects is an event, the processors 106a-106n may generate the notification 402. The notification 402 may be implemented to warn the user about the event.

The processors 106a-106n may be configured to determine whether the driver 202 has seen the detected event based on the gaze projection 370a-370b. In one example, if the detected event is detected using video data captured by the lens 112f and the target of the projected gaze 370a-370b (e.g., the display 118g) is displaying the video data captured by the lens 112f, then the processor 106a-106n may infer that the driver 202 has seen the detected event. In another example, if the detected event is detected using video data captured by the lens 112d (or the lens 112e) and the target of the projected gaze 370a-370b (e.g., the display 118g) is displaying the video data captured by the lens 112f (or other information such as infotainment information), then the processor 106a-106n may infer that the driver 202 has not seen the detected event.

The processors 106a-106n may be configured to select one or more of the displays 118a-118n for displaying the notification 402. The selected display may correspond to the target of the projected gaze 370a-370b. For example, displaying the notification on the display 118c may not be useful or may be distracting to the driver 202 if the driver 202 is looking at the display 118g. The processors 106a-

106n may display the notification 402 on the selected display (e.g., the display 118g in the example shown).

By a combination of CMS and DMS, the detected gaze of the driver 202 may be used to actively alert the driver 202 for each display in which the potential hazard (e.g., the event) is visible depending on the viewing direction of the driver 202. The driver 202 may be warned in case the event (e.g., a hazard) is detected in one of the field of views and the driver 202 is not paying attention (e.g., not looking at where the event has occurred). The solution may be applied to a single channel or multi-channel e-mirror system.

In an example, the display 118g may be the target of the gaze projection 370a-370b. The processors 106a-106n may determine that the display 118g is the selected display based on the gaze projection 370a-370b. The display 118c may display the view corresponding to the lens 112d (e.g., the passenger side rear view) and the event may be detected in the video data captured using the lens 112d. If the display 118g is displaying infotainment information, the driver 202 may not see the detected event. Instead of (or in addition to) displaying a warning on the display 118c, which the driver 202 may not see, the processors 106a-106n may generate the warning on the selected display 118g.

Similarly, the processors 106a-106n may be configured to suppress (e.g., not display) the notification 402 if the driver 202 has seen the detected event. In another example, the display 118g may be the target of the gaze projection 370a-370b. The processors 106a-106n may determine that the display 118g is the selected display based on the gaze projection 370a-370b. The display 118g may display the view corresponding to the lens 112d (e.g., the passenger side rear view) and the event may be detected in the video data captured using the lens 112d. If the display 118g is displaying the detected event captured using the lens 112d, then the processors 106a-106n may infer that the driver 202 is looking at or has already seen the detected event. Since the driver 202 may not need to be informed about the detected event that has already been seen, the processors 106a-106n may decide not to display the notification 402. For example, displaying too many notifications may be irritating and/or distracting for the driver 202.

Figure 8:
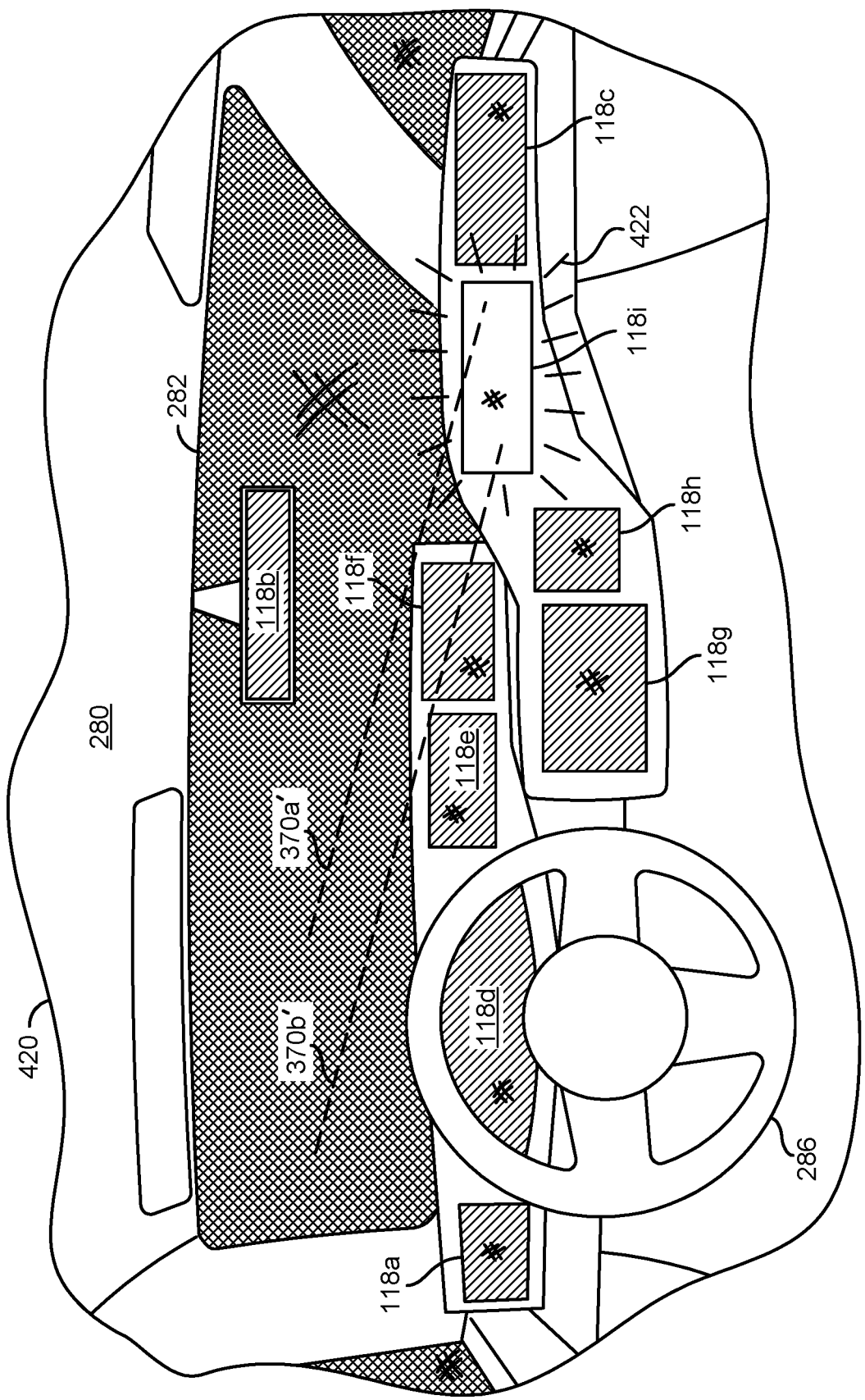
FIG. 8 is a diagram illustrating adjusting content presented by a display when the driver is looking at the display using a brightness adjustment.

Referring to FIG. 8, a diagram illustrating adjusting content presented by a display when the driver is looking at the display using a brightness adjustment is shown. A perspective 420 is shown. The perspective 420 may be a representation of a view of an interior 280 of the ego vehicle 50 during the night time (e.g., dark outside). The perspective 420 may generally provide a view of the interior 280 from the location and direction of the driver 202 but may not be what the driver 202 would actually see (e.g., may not be representative of the gaze direction 260a-260b).

In case of e-mirror (or CMS) displays 118a-118n, the e-mirrors may have to be active all the time while driving (e.g., to implement a reflective mirror replacement). To be active all the time, the displays 118a-118n may be configured to stream the video data VOUT_A-VOUT_N during day and night time. During daytime, a bright display setup may be implemented in order to see all content. During night time a different display setup may be implemented in order to ensure the video content is displayed in a useful way (e.g., clearly visible) but also not distracting or irritating to the driver 202 and/or the passengers by having a display that is too bright (e.g., a bright display in the peripheral vision may be an irritant). Additionally, the human eye adjusts based on environmental conditions (e.g., light and dark). The apparatus 100 may be configured to implement in-cabin conditions to enable the eyes 202a-202b to adapt comfortably (e.g., prevent discomfort due to brightness in a dark environment).

The interior 280 of the ego vehicle 50 is shown. The gaze interior 280 may comprise the windshield 282, the dashboard 284, the steering wheel 286 and/or the displays 118a-118i are shown. In the example shown, the exterior of the ego vehicle 50 (e.g., outside the windshield 282) is shown as dark. The gaze projection 370a'-370b' is shown. In the example shown, the gaze projection 370a'-370b' may start from a location in front of the steering wheel 286 (e.g., generally where the driver 202 would be sitting), and the gaze projection 370a'-370b' may end at the display 118i. The display 118i may be the target of the gaze of the driver 202.

Each of the displays 118a-118h are shown darkened. The processors 106a-106n may be configured to detect that the exterior of the ego vehicle 50 is dark and, in response to the dark environment, adjust the content of one or more of the displays 118a-118i. The adjustment performed by the processors 106a-106n may be to reduce a brightness of the displays 118a-118i that are not in the field of view (e.g., the projected gaze 370a-370b) of the driver 202. Generally, bright displays in a dark environment may be distracting to the driver 202. By darkening the displays 118a-118n the processors 106a-106n may reduce distractions to the driver 202. However, when the displays are darkened, the driver 202 may not be able to see content shown on the darkened displays.

Lines 422 are shown extending from the display 118i. The lines 422 may represent an adjustment to the video output of the display 118i. In one example, the adjustment 422 may be a brightness increase. The processors 106a-106n may be configured to adjust the content of one or more of the displays 118a-118n using the brightness adjustment 422 when the driver 202 is looking at a particular one of the displays 118a-118n. In the example shown, the brightness adjustment 422 is shown on the display 118i. The display 118i is shown as bright and the other displays (e.g., 118a-118h) may be darkened.

The adjustment 422 may be communicated as part of the signal VOUT_I generated by the processors 106a-106n. For example, the processors 106a-106n may generate the sequence of video frames with the adjustment 422 of brightened video frames (or alternatively, the signals VOUT_A-VOUT_H may be darkened video frames) and the display 118i may display the video frames with the increased brightness 422. In another example, the processors 106a-106n may generate the adjustment separate from the video data. The processors 106a-106n may communicate the video data and the video data may be displayed by the display 118i. The processors 106a-106n may communicate the adjustment 422 separate from the video data to the display 118i. The display 118i may be configured to display the video frames and adjust the brightness according to the adjustment 422. In an example, the adjustment 422 may be a configuration parameter that may be interpreted by the display 118i to adjust the output. The communication and/or display of the adjustment 422 may be varied according to the design criteria of a particular implementation.

By combination of CMS and DMS, the detected gaze 370a'-370b' of the driver 202 may be used to actively drive the display setup depending on the viewing direction of the driver 202. For example, in the dark environment, the displays 118a-118i may be set at a non-distracting (e.g., low) brightness and then switch to full performance mode only when the driver 202 is actually looking in the direction of the mirror replacement display (e.g., the display 118*i* in the example shown).

The processors 106*a*-106*n* may determine the target of the projected gaze 370*a*'-370*b*' to infer what the driver 202 is looking at. The processors 106*a*-106*n* may be configured to select one or more of the displays 118*a*-118*n* for displaying the brightness adjustment 422. The selected display may correspond to the target of the projected gaze 370*a*'-370*b*'. For example, increasing the brightness of the display 118*c* may not be useful or may be distracting to the driver 202 if the driver 202 is looking at the display 118*g*. The processors 106*a*-106*n* may increase the brightness 422 on the selected display (e.g., the display 118*i* in the example shown).

In an example, the processors 106*a*-106*n* may determine that the target of the projected gaze 370*a*'-370*b*' may be the display 118*i*. The processors 106*a*-106*n* may perform the adjustment 422 while the driver 202 is looking at the display 118*i*. If the driver 202 changes the gaze direction (e.g., the projected gaze 370*a*'-370*b*' is determined to have a target of the display 118*a*), then the processors 106*a*-106*n* may react in real-time to the change of gaze direction. For example, if the target changes from the display 118*i* to the display 118*a* (e.g., the driver 202 looks away from the target display 118*i*), then the selected display may become the display 118*a*. The processors 106*a*-106*n* may darken (e.g., decrease) the brightness of the previously selected display 118*i* and adjust (e.g., increase) the brightness of the new selected display 118*a*. In another example, if the target changes from the display 118*i* to the windshield 282, then none of the displays 118*a*-118*i* may be selected (e.g., all display may become darkened).

Figure 9:
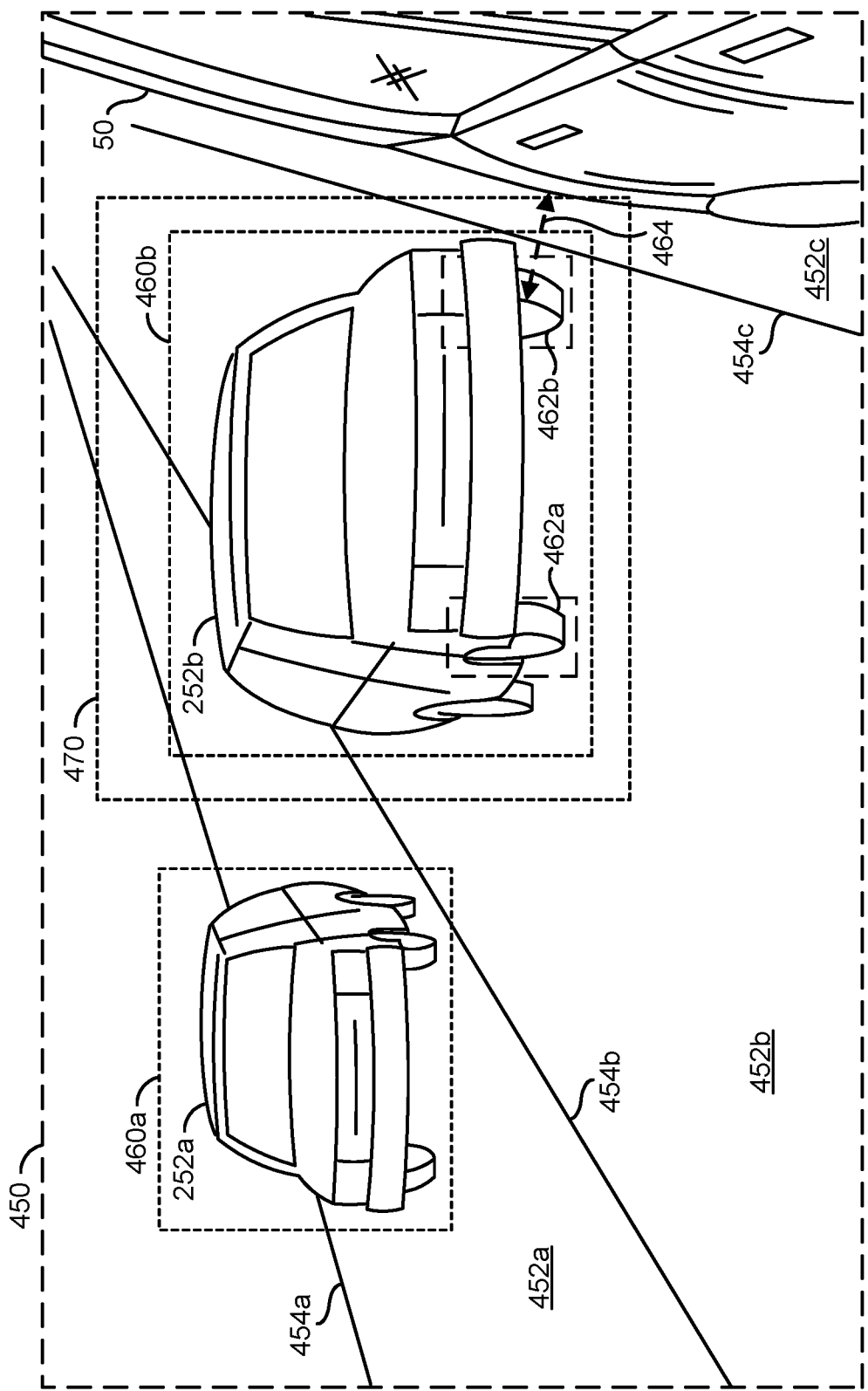
FIG. 9 is a diagram illustrating an event detection in response to video analysis of a video frame.

Referring to FIG. 9, a diagram illustrating an event detection in response to video analysis of a video frame is shown. An example video frame 450 is shown. In the example shown, the example video frame 450 may be a video frame captured using the lens 112*d*. For example, the example video frame 450 may show a rear passenger side view (e.g., similar to a view that would be visible through a passenger side reflective rearview mirror). The capture devices 102*a*-102*n*, the lens 112*a*-112*n* and/or the view (e.g., rear view, front view, side view, etc.) captured in the example video frame 450 may be varied according to the design criteria of a particular implementation.

The example video frame 450 may be presented to the processors 106*a*-106*n* as one of the signals FRAMES_A-FRAMES_N. The processors 106*a*-106*n* may be configured to perform the video analysis on the content of the example video frame 450. In an example, the CNN module 150 may be configured to detect, classify and/or recognize objects present in the example video frame 450. The processors 106*a*-106*n* may be configured to determine whether an event has occurred. In an example, the decision module 158 may be configured to analyze the objects detected and/or classified by the CNN module 150 and understand the scenario. The decision module 158 may use a combination of the video analysis and the sensor data processed by the sensor fusion module 152 to make inferences. The inferences may be used to determine whether the scenario detected is considered an event or not.

The vehicles 252*a*-252*b* and a portion of the ego vehicle 50 is shown in the example video frame 450. Lanes 452*a*-452*c* are shown. Lane boundary lines 454*a*-454*c* are shown. The lane 452*a* may be bounded by the lane boundary lines 454*a*-454*b*, the lane 452*b* may be bounded by the lane boundary lines 454*b*-454*c* and the portion of the lane 452*c* shown may be bounded by the lane boundary line 454*c*. The vehicle 252*a* is shown traveling in the lane 452*a*.

The vehicle 252*b* is shown in the lane 452*b* but crossing (e.g., veering) over towards the lane 452*c* (e.g., driving erratically or not following expected traffic behavior). The ego vehicle 50 is shown in a lane 452*c*. The vehicle 452*b* may be on a collision course with the ego vehicle 50 (e.g., the driver 202 should be made aware of the vehicle 252*b*).

A box 460*a* and a box 460*b* are shown. The boxes 460*a*-460*b* may represent objects detected using the CNN module 150. The processors 106*a*-106*n* may be configured to perform video operations to detect objects in the video frames. The CNN module 150 may detect the object 460*a* and classify the object 460*a* as the vehicle 252*a*. The CNN module 150 may detect the object 460*b* and classify the object 460*b* as the vehicle 252*b*. The CNN module 150 may further detect, classify and/or recognize other objects (e.g., the portion of the ego vehicle 50, the lane boundaries 454*a*-454*c*, curbs, bicycles, trees, street signs, street lights, stop lights, pedestrians, animals, medians, barriers, etc.). The number and/or types of objects detected, classified and/or recognized may be varied according to the design criteria of a particular implementation.

The CNN module 150 may be further configured to detect and/or analyze characteristics of the detected objects 460*a*-460*b*. The characteristics may comprise attributes such as shape, size, color(s), vehicle type (e.g., make, model, year, etc.), direction of travel, speed, etc. In some embodiments, the object 460*a* may be detected as a vehicle. In some embodiments, the object 460*a* may be detected as a particular vehicle (e.g., uniquely identified and differentiated from other vehicles on the road). The number and/or types of characteristics of the detected objects 460*a*-460*b* detected by the processors 106*a*-106*n* may be varied according to the design criteria of a particular implementation.

Characteristics 462*a*-462*b* are shown. The characteristics 462*a*-462*b* may correspond to the detected object 460*b*. In the example shown, the characteristics 462*a*-462*b* may be the front wheels of the vehicle 252*b*. In an example, the CNN module 150 may detect the direction that the wheels 462*a*-462*b* are facing (e.g., the wheels 462*a*-462*b* may be directed towards the ego vehicle 50). For example, the decision module 150 may use the characteristics 462*a*-462*b* (e.g., the direction of the wheels) to make the inference that the vehicle 252*b* is directed and/or driving towards the ego vehicle 50.

A dotted arrow 464 is shown. The dotted arrow 464 may represent a distance calculation between the ego vehicle 50 and the vehicle 252*b*. In some embodiments, the video operations performed by the processors 106*a*-106*n* may be configured to perform a distance measurement between two detected objects (e.g., using pixel measurements and/or other measurement techniques using video data). In some embodiments, one or more of the sensors 114 may be configured to detect and/or calculate distances. For example, the sensor fusion module 152 may provide supplemental data for distance calculations performed using the video analysis by cross-referencing with distance values determined by proximity sensors. In some embodiments, the sensor fusion module 152 may be configured to combine the video data analysis with the proximity measurements of the sensors 114 to correlate distances measured by the sensors 114 with a particular one of the vehicles 252*a*-252*b*. The method of measuring distances between objects may be varied according to the design criteria of a particular implementation.

A dotted box 470 is shown. The dotted box 470 may represent an event detected by the processors 106a-106n. For example, based on the information in the example video frame 450 and/or data from the sensors 114, the decision module 158 may determine whether an event has occurred. The event 470 is shown corresponding to the vehicle 452b.

The decision module 158 may use multiple sources of data to determine whether the event 470 has occurred. In the example shown, the vehicle 252a is shown driving normally in the lane 452a. Since the vehicle 252a may not be expected to collide with the ego vehicle 50, the vehicle 252a may not correspond with the event 470. In the example shown, the vehicle 252b may be determined to be leaving the lane 452b and entering the lane 452c (e.g., the vehicle 252b may be detected reaching and/or crossing over the lane boundary 454c). Furthermore, the wheel characteristics 462a-462b may indicate that the vehicle 252b is directed towards the ego vehicle 50. The distance measurement 464 may further indicate that the vehicle 252b is close to the ego vehicle 50 (e.g., the determination of the event 470 may be based on a minimum threshold distance between vehicles and/or objects). One of the features and/or characteristics of the vehicle 252b, the relationship between the vehicle 252b and the ego vehicle 50 and/or a combination of the characteristics and relationships may be used to determine that the detected object 460b should be considered as the event 470.

In the example shown, the event 470 may correspond to an imminent collision. The event 470 may correspond to other events. In one example, the event 470 may be determined in response to detecting flashing lights (e.g., police and/or ambulance lights). In another example, the event 470 may be determined in response to detecting a pedestrian crossing the road. In yet another example, the event 470 may be determined in response to a known destination of the ego vehicle 50 (e.g., directions and turns from GPS navigation may be detected). The types and/or triggers for detecting the event 470 may be varied according to the design criteria of a particular implementation.

The example video frame 450 may be a representative example of the output video data (e.g., the signals VOUT_A-VOUT_N) presented on the displays 118a-118n. For example, the example video frame 450 may be displayed on one of the displays 118a-118n that is showing the passenger side rear view to the driver 202. The boxes 460a-460b, the boxes 462a-462b, the arrow 464 and/or the box 470 may be shown on the example video frame 450 to provide representative illustrations of video operations performed by the processors 106a-106n (e.g., boxes and/or arrows may not be visible on the output of the displays 118a-118n). In some embodiments, one or more of the boxes 460a-460b, the boxes 462a-462b, the arrow 464 and/or the box 470 may be displayed on the output of the displays 118a-118n as the notification 402 (e.g., to provide highlighting for a detected object or to highlight the detected event 470). For example, the notification 402 may be a visual alert such as the box 470 that corresponds to the detected object 460b in the example video frame 450. The notification 402 may be displayed when the detected object 460b that corresponds to the event 470 is not visible in the projected gaze 370a-370b (or one of the displays 118a-118n that corresponds to the projected gaze 370a-370b).

Figure 10:
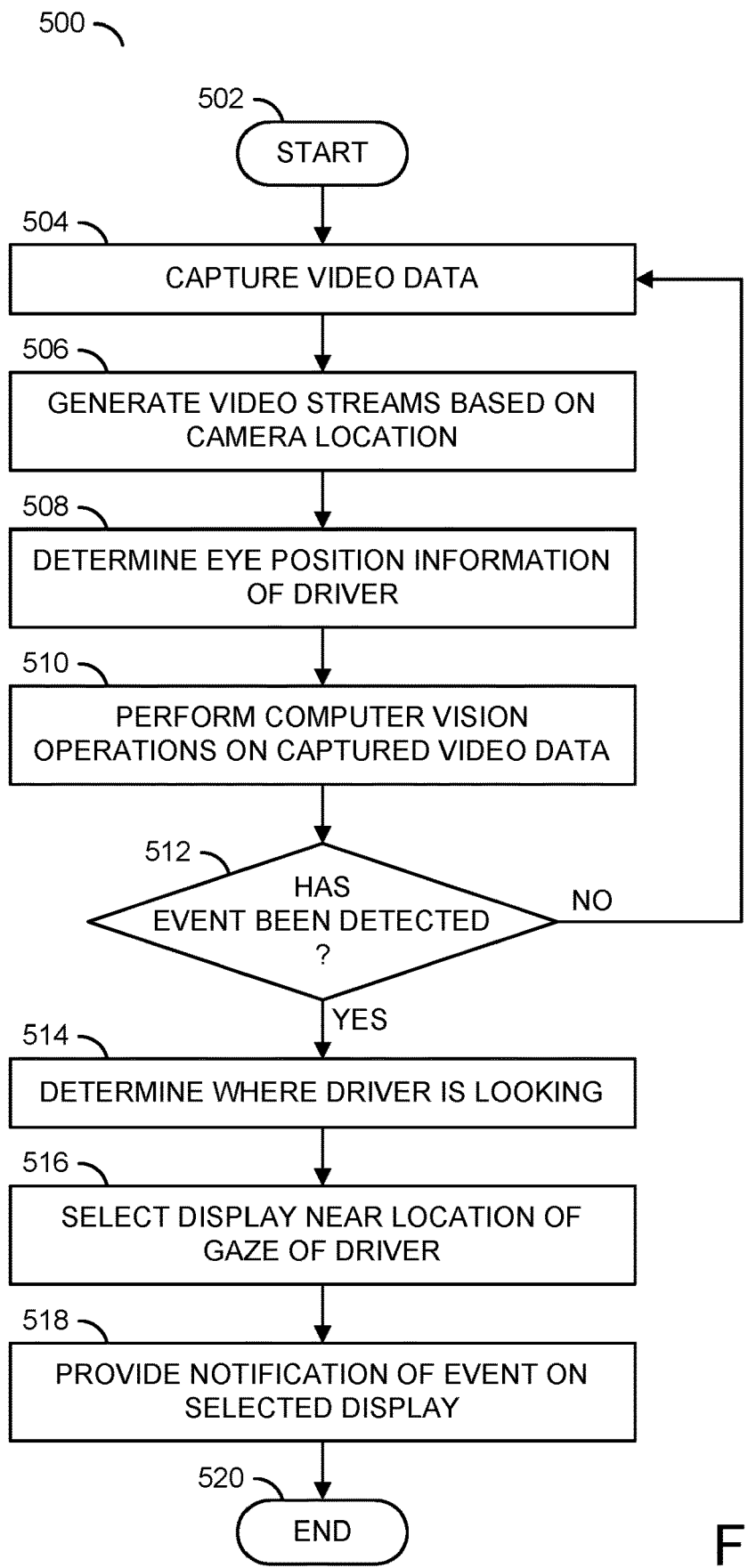
FIG. 10 is a flow diagram illustrating a method for determining a gaze of a driver and displaying a notification.

Referring to FIG. 10, a method (or process) 500 is shown. The method 500 may determine a gaze of a driver and display a notification. The method 500 generally comprises a step (or state) 502, a step (or state) 504, a step (or state) 506, a step (or state) 508, a step (or state) 510, a decision step (or state) 512, a step (or state) 514, a step (or state) 516, a step (or state) 518, and a step (or state) 520.

The step 502 may start the method 500. Next, in the step 504, the capture devices 102a-102n may capture the video data. For example, the capture devices 102a-102n may generate the signals FRAMES_A-FRAMES_N corresponding to fields of view targeted to the environment around the ego vehicle 50 and/or to views targeted to the interior 280 of the ego vehicle 50. In the step 506, the processors 106a-106n may generate the video streams VOUT_A-VOUT_N. The video streams VOUT_A-VOUT_N may be presented to the displays 118a-118n based on the camera location. For example, the display 118a may be the display that receives video data corresponding to a rear driver side view (e.g., corresponding to the lens 112f shown in association with FIG. 3).

Next, in the step 508, the DSM 120 may determine the eye position information 304ra-304rc for the right eye 302a and the eye position information 304la-304lc for the left eye 302b of the driver 202. Furthermore, the eye position information may be determined based on the body position of the driver 202 and/or the position of the detected head 360 of the driver 202. In the step 510, the CNN module 150 may perform the computer vision operations on the captured video data. For example, computer vision operations may be performed on the signals FRAMES_A-FRAMES_N of the capture devices 102a-102n that are configured to capture video data of the environment outside of the ego vehicle 50 in order to detect objects and/or determine whether an event has occurred. Next, the method 500 may move to the decision step 512.

In the decision step 512, the decision module 158 may determine whether an event has been detected. In one example, the event may be one of the vehicles 252a-252n that is on a collision course with the ego vehicle 50. If no event has been detected, the method 500 may return to the step 504. If an event has been detected, the method 500 may move to the step 514.

In the step 514, the processors 106a-106n may determine where the driver 202 is looking. For example, the processors 106a-106n may determine the location of the eyes 302a-302b within the interior 280 and/or determine the projected gaze 370a-370b. Next, in the step 516, the processors 106a-106n may select one or more of the displays 118a-118n near the location of the gaze of the driver 202. For example, the processors 106a-106n may determine the target of the gaze projection 370a-370b based on knowledge of locations of the components of the ego vehicle 50 within the interior 280 (e.g., by comparing the gaze projection 370a-370b with the predetermined location of the displays 118a-118n within the interior 280 of the ego vehicle 50). The selected one of the displays 118a-118n may be the target of the gaze projection 370a-370b. In the step 518, the processors 106a-106n may adjust the video content (e.g., one of the signals VOUT_A-VOUT_N) in order to display the notification 402 of the event on the selected one of the displays 118a-118n. Next, the method 500 may move to the step 520. The step 520 may end the method 500.

Generally, the selected one of the displays 118a-118n may be the target of the gaze projection 370a-370b. In some embodiments, the processors 106a-106n may select one of the displays 118a-118n near the target of the gaze projection 370a-370b. For example, if the processors 106a-106n determine that the notification 402 may interfere with and/or interrupt what is displayed on the target of the gaze projection 370a-370b then an alternate display may be selected (e.g., a display near the periphery of the projected field of view that the driver 202 may be able to see). For example, if the target of the gaze projection 370a-370b is a small screen size and is displaying important information (e.g., the rear driver side view), the notification 402 may cover too much important information (e.g., the driver 202 may not be able to see the vehicle 252a if the notification 402 is overlaid on top of the video data). To avoid covering important information, the processors 106a-106n may select another nearby display for displaying the notification 402.

Figure 11:
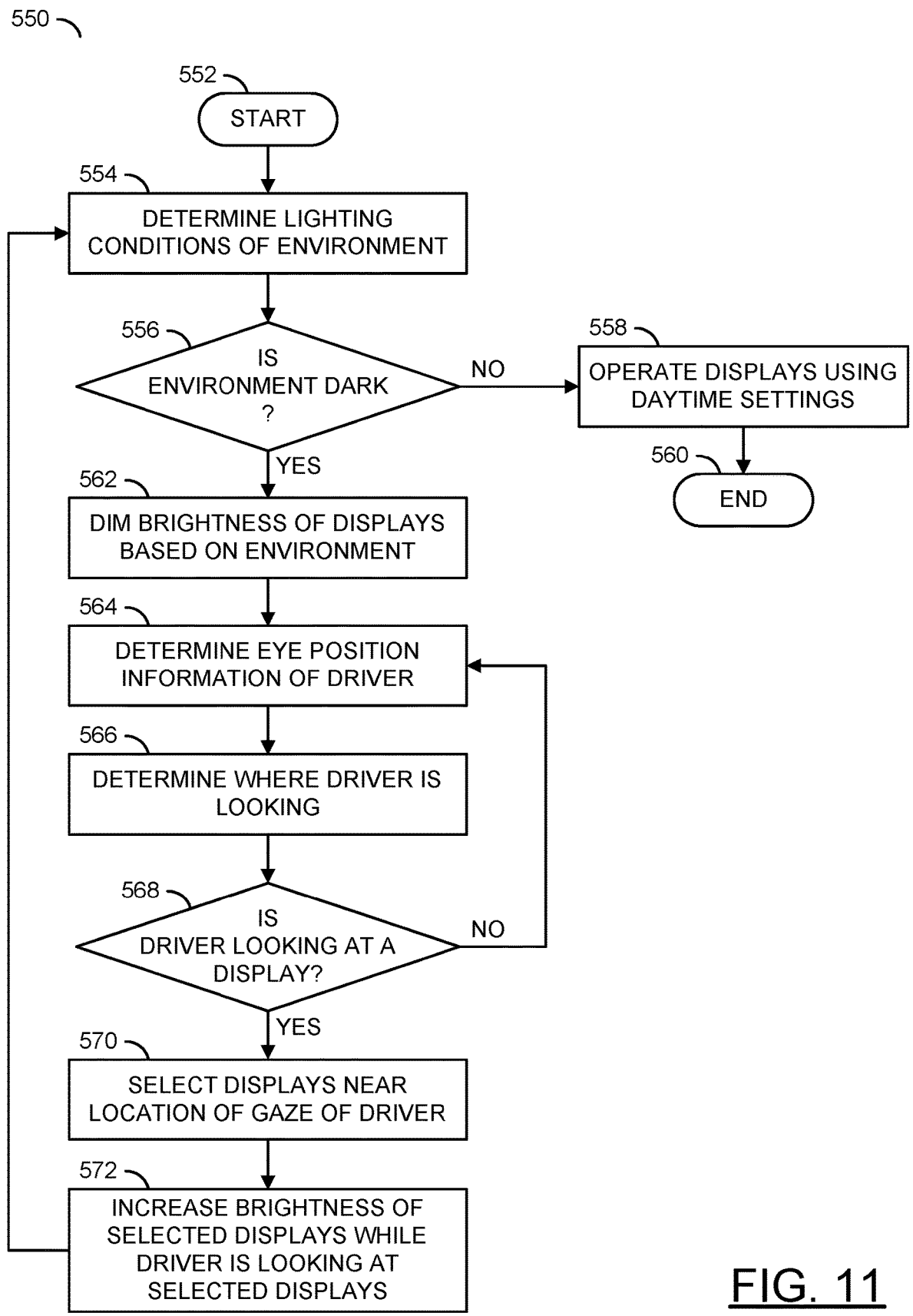
FIG. 11 is a flow diagram illustrating a method for adjusting a brightness of a display corresponding to a gaze of a driver.

Referring to FIG. 11, a method (or process) 550 is shown. The method 550 may adjust a brightness of a display corresponding to a gaze of a driver. The method 550 generally comprises a step (or state) 552, a step (or state) 554, a decision step (or state) 556, a step (or state) 558, a step (or state) 560, a step (or state) 562, a step (or state) 564, a step (or state) 566, a decision step (or state) 568, a step (or state) 570, and a step (or state) 572.

The step 552 may start the method 550. In the step 554, the processors 106a-106n may determine the lighting conditions of the environment in the interior 280. In one example, computer vision may be used on the captured video frames FRAMES_A-FRAMES_N to determine the lighting conditions. In another example, the sensors 114 may comprise a photodiode. In yet another example, the processors 106a-106n may determine the time of day and compare the current time to sunset times. Next, the method 550 may move to the decision step 556.

In the decision step 556, the processors 106a-106n may determine whether the environment is dark. In one example, the threshold for what is considered dark may be a user-selected option. In another example, the threshold for what is considered dark may be based on statistical information about driver preferences. If the environment is not dark, the method 550 may move to the step 558. In the step 558, the apparatus 100 may operate the displays 118a-118n using daytime settings (e.g., full brightness and/or a brightness level selected by the driver 202). Next, the method 550 may move to the step 560. The step 560 may end the method 550.

In the decision step 556, if the environment is dark, the method 550 may move to the step 562. In the step 562, the processors 106a-106n may provide instructions to the displays 118a-118n to dim the brightness level of the display based on the light level of the environment. Next, in the step 564, the DSM 120 may determine the eye position information of the driver 202. In the step 566, the processors 106a-106n may determine where the driver 202 is looking. Next, the method 550 may move to the decision step 568.

In the decision step 568, the processors 106a-106n may determine whether the driver 202 is looking at one of the displays 118a-118n (e.g., based on the gaze projection 370a-370b). If the driver 202 is not looking at one of the displays 118a-118n, the method 550 may return to the step 564. If the driver 202 is looking at one of the displays 118a-118n, then the method 550 may move to the step 570.

In the step 570, the decision module 158 may select one or more of the displays 118a-118n near the location (e.g., target) of the projected gaze 370a-370b of the driver 202. Next, in the step 572, the processors 106a-106n may adjust the video content of the selected displays 118a-118n with the brightness adjustment 422 while the driver 202 is determined to be looking at the selected displays 118a-118n. Next, the method 550 may return to the step 554.

Figure 12:
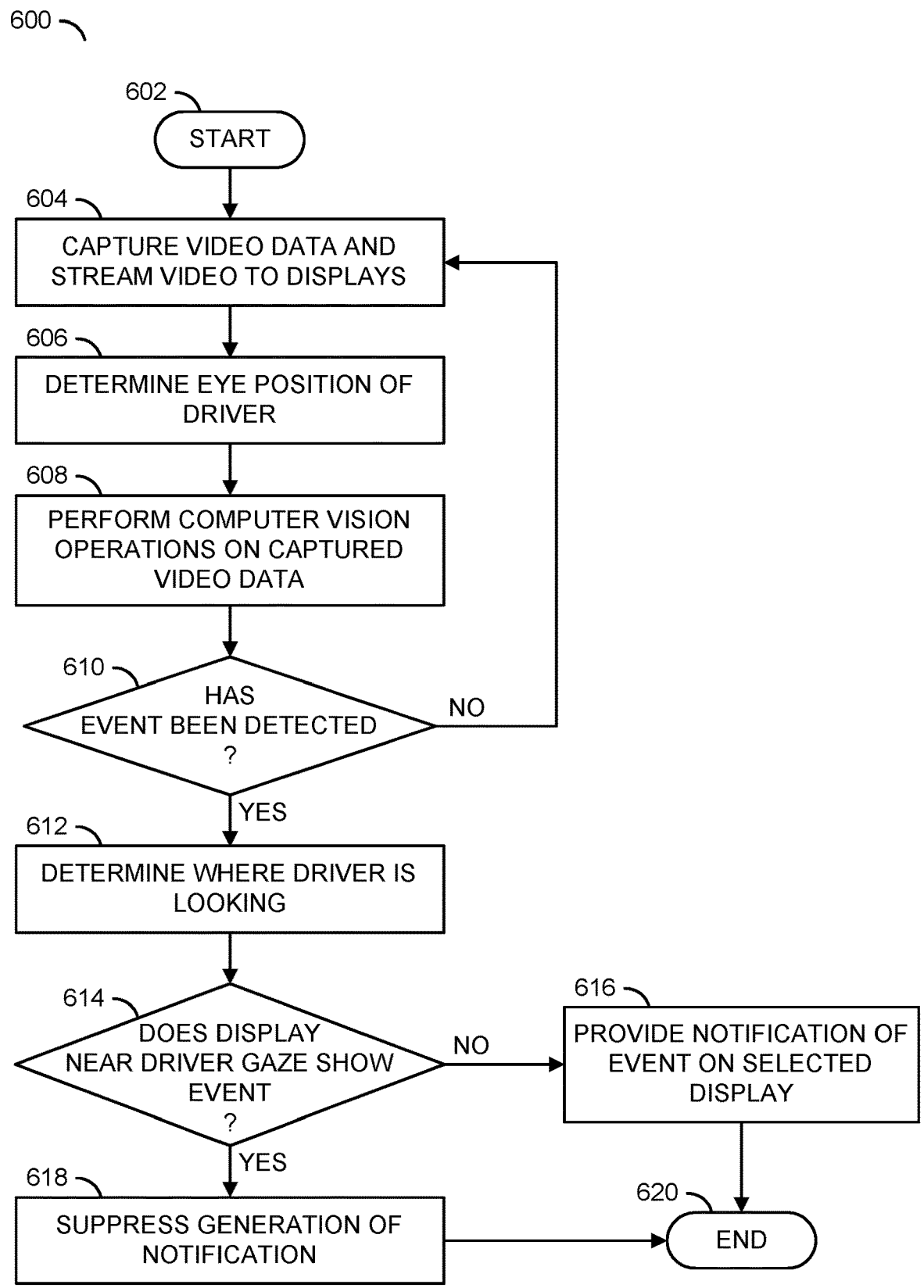
FIG. 12 is a flow diagram illustrating a method for suppressing a notification when a driver is looking at a detected event.

Referring to FIG. 12, a method (or process) 600 is shown. The method 600 may suppress a notification when a driver is looking at a detected event. The method 600 generally comprises a step (or state) 602, a step (or state) 604, a step (or state) 606, a step (or state) 608, a decision step (or state) 610, a step (or state) 612, a decision step (or state) 614, a step (or state) 616, a step (or state) 618, and a step (or state) 620.

The step 602 may start the method 600. In the step 604, the processors 106a-106n may receive the video data captured by the capture devices 102a-102n and stream the video content to the displays 118a-118n. Next, in the step 606, the DSM 120 may determine the eye position of the driver 202. In the step 608, the CNN module 150 may perform the computer vision operations on the captured video data (e.g., the signals FRAMES_A-FRAMES_N). Next, the method 600 may move to the decision step 610.

In the decision step 610, the decision module 158 may determine whether an event has been detected. Whether objects detected are considered an event may be determined based on the computer vision operations and/or using the sensor fusion module 152 to combine computer vision information with readings from the sensors 114. If an event has not been detected, the method 600 may return to the step 604. If an event has been detected, the method 600 may move to the step 612. In the step 612, the processors 106a-106n may determine where the driver 202 is looking (e.g., the target of the gaze projection 370a-370b). Next, the method 614 may move to the decision step 614.

In the decision step 614, the processors 106a-106n may determine whether the displays 118a-118n that are near the target of the gaze projection 370a-370b show the detected event. For example, if the display 118a displays the rear driver side view where the event has been detected and is the target of the gaze of the driver 202 then the display 118a may show the event. If the driver is looking at another display then the display may not show the event. If the gaze of the driver 202 does not correspond with the location of the detected event, then the method 600 may move to the step 616. In the step 616, the processors 106a-106n may provide the notification 402 of the event on the selected one of the displays 118a-118n. Next, the method 600 may move to the step 620. If the gaze of the driver 202 does correspond with the location of the detected event, then the method 600 may move to the step 618. In the step 618, the processors 106a-106n may suppress the generation of the notification 402. Next, the method 600 may move to the step 620. The step 620 may end the method 600.

Figure 13:
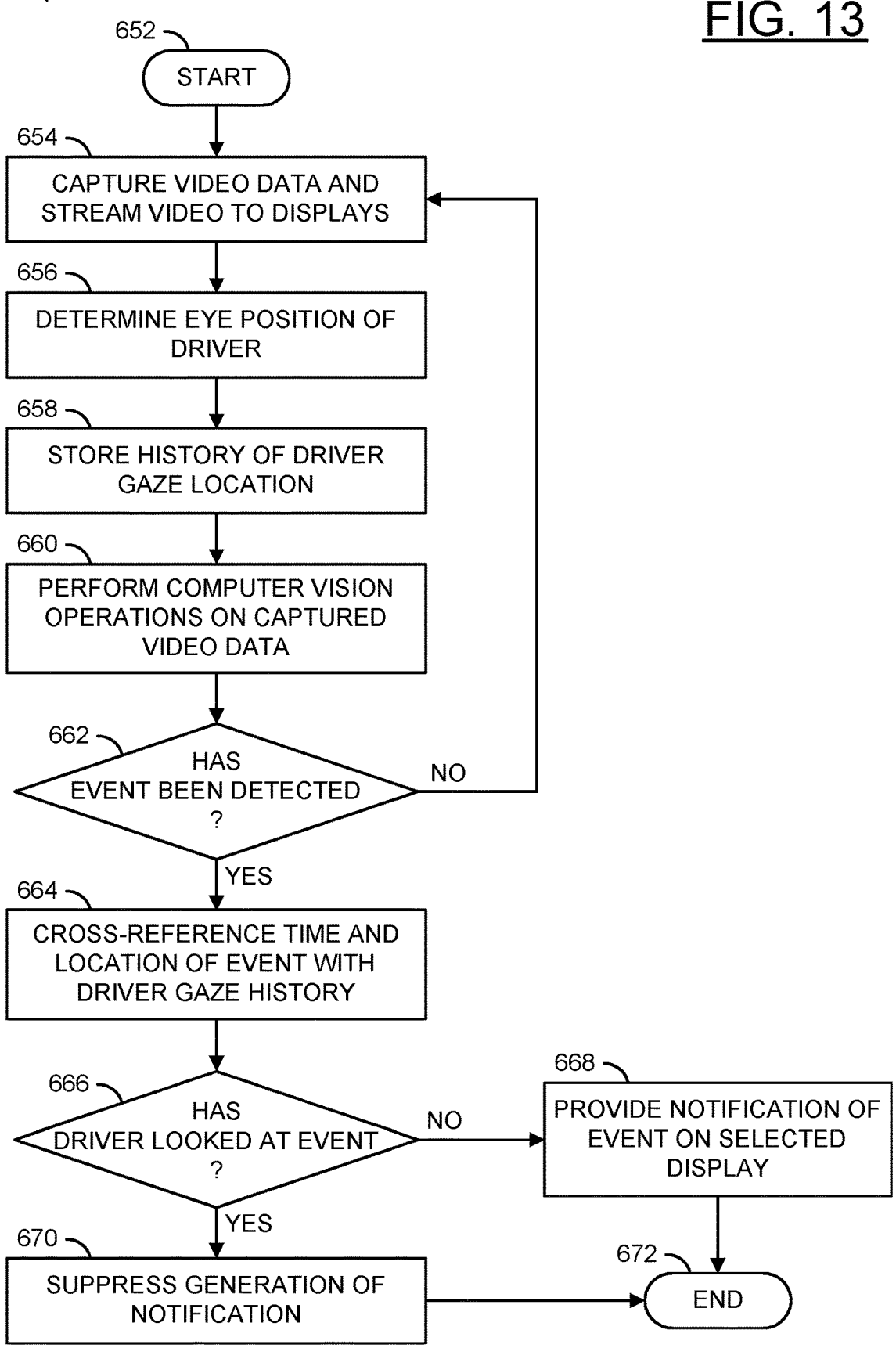
FIG. 13 is a flow diagram illustrating a method for tracking a history of gaze locations.

Referring to FIG. 13, a method (or process) 650 is shown. The method 650 may track a history of gaze locations. The method 650 generally comprises a step (or state) 652, a step (or state) 654, a step (or state) 656, a step (or state) 658, a step (or state) 660, a decision step (or state) 662, a step (or state) 664, a decision step (or state) 666, a step (or state) 668, a step (or state) 670, and a step (or state) 672.

The state 652 may start the method 650. Next, in the step 654, the capture devices 102a-102n may capture the video data (e.g., the video frames FRAMES_A-FRAMES_N), the processors 106a-106n may generate the video content VOUT_A-VOUT_N and stream the video content to the displays 118a-118n. In the step 656, the DSM 120 may determine the eye position of the driver 202. Next, in the step 658, the processors 106a-106n may determine the gaze projection 370a-370b, determine the target of the gaze and the memory 108 may store a history of the driver gaze target locations (e.g., track the eye position of the driver 202 over time). In the step 660, the CNN module 150 may perform the computer vision operations on the captured video data (e.g., the signals FRAMES_A-FRAMES_N) corresponding to the environment near the ego vehicle 50 in order to detect events. Next, the method 650 may move to the decision step 612.

In the decision step 662, the decision module 158 may determine whether an event has been detected. If an event has not been detected, the method 650 may return to the step 654. If an event has been detected, the method 650 may move to the step 664. In the step 664, the processors 106a-106n may cross-reference the time and location of the detected event with the gaze history of the driver 202. Next, the method 650 may move to the decision step 666.

In the decision step 666, the processors 106a-106n may determine whether the driver 202 has looked at the event. For example, if the target of the gaze projection 370a-370b from the gaze history matches the time and location of the detected event (e.g., the detected object corresponding to the event 470 was shown in the field of view shown on the last viewed display of the driver 202), then the processors 106a-106n may infer that the driver 202 has seen the detected event. If the driver 202 has not looked at the event, then the method 650 may move to the step 668. In the step 668, the processors 106a-106n may generate the notification 402 to be displayed on the selected one of the displays 118a-118n. Next, the method 650 may move to the step 672. In the decision step 666, if the driver 202 has looked at the detected event, the method 650 may move to the step 670. In the step 670, the processors 106a-106n may suppress the generation of the notification 402. Next, the method 650 may move to the step 672. The step 672 may end the method 650.

The history of the gaze projection 370a-370b may be stored in the memory 108 (e.g., a correlation of gaze target locations with a time stamp of when the gaze was determined). The stored history of the gaze projection 370a-370b may be used to determine where the driver 202 has been looking at various points in time. In one example, the gaze history may be used for statistical information (e.g., to determine where drivers tend to look in certain scenarios). In another example, the gaze history may be used for legal purposes (e.g., detecting distracted drivers). In yet another example, the gaze history may be used for insurance purposes (e.g., to determine whether the driver 202 was paying attention when a collision occurred). The use of the gaze history may be varied according to the design criteria of a particular implementation.

The functions performed by the diagrams of FIGS. 1-13 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   an interface to communicate video data to a display; and
   a processor configured to (i) receive video frames from a capture device, (ii) generate video data for said display in response to said video frames, (iii) perform operations to detect an object in said video frames and (iv) determine eye position information, wherein (a) said eye position information is used to determine whether a driver is looking at said display, (b) said processor is configured to adjust content presented by said display when said driver is looking at said display by presenting a notification overlaid on the video data, and (c) said processor is further configured to (i) track said eye position information over time to determine a gaze history of said driver, (ii) cross-reference said gaze history with a detection time of said object and a detection location of said object in said video frames, (iii) determine whether a field of view of said driver from said gaze history matches said detection time and said detection location of said object and (iv) suppress said notification if said field of view in said gaze history indicates that said driver has previously viewed said object.

2. The apparatus according to claim 1, wherein said eye position information comprises a direction of said field of view of said driver.

3. The apparatus according to claim 2, wherein said processor is configured to determine where said driver is looking based on said field of view of said driver.

4. The apparatus according to claim 3, wherein (i) said display is one of a plurality of displays implemented within a vehicle and (ii) said processor is further configured to determine a most likely display from said plurality of said displays that said driver is looking at within said vehicle.

5. The apparatus according to claim 1, wherein said content presented by said display is adjusted using a visual alert.

6. The apparatus according to claim 5, wherein said visual alert corresponds to said object detected in said video frames.

7. The apparatus according to claim 6, wherein said object is not visible in said field of view corresponding to said eye position information.

8. The apparatus according to claim 1, wherein said content presented by said display is adjusted to increase a brightness of said display.

9. The apparatus according to claim 8, wherein said brightness is increased in response to said operations detecting a dark environment.

10. The apparatus according to claim 9, wherein said processor reduces a brightness of one or more displays that are not in said field of view corresponding to said eye position information.

11. The apparatus according to claim 1, wherein said processor determines where said driver is looking by (i) receiving said eye position information comprising a location of eyes of said driver in 3D space, (ii) determining a direction of said eyes and (iii) projecting said field of view of said driver in said direction of said eyes from said location of said eyes.

12. The apparatus according to claim 11, wherein said processor is configured to compare said field of view of said driver with a predetermined location of said display in a vehicle.

13. The apparatus according to claim 12, wherein said field of view of said driver is determined based on a distance from said location of said eyes to said predetermined location of said display.

14. The apparatus according to claim 1, wherein (i) said display is one of a plurality of displays, (ii) said processor is further configured to generate said video data for said plurality of said displays and (iii) said video data for at least one of said displays corresponds to said capture device capturing a rear view from a vehicle.

15. The apparatus according to claim 14, wherein at least one of said plurality of said displays implements an electronic mirror configured to emulate a rear view from a reflective mirror.

16. The apparatus according to claim 14, wherein (i) said content presented by one of said displays is adjusted using said notification that corresponds to said object detected in said video frames, (ii) said notification is presented to a selected one of said displays determined based on where said driver is looking and (iii) other displays of said plurality of said displays do not display said notification.

17. The apparatus according to claim 16, wherein said notification presented to said selected one of said displays corresponds to a visual alert of an event visible on said other displays.

18. The apparatus according to claim 14, wherein said processor is further configured to (i) determine whether said driver is in a dark environment and (ii) when said driver is in said dark environment (a) reduce a brightness of said plurality of said displays, (b) select one or more of said plurality of said displays based on where said driver is looking, (c) increase a brightness of said selected displays that correspond to where said driver is looking and (d) reduce a brightness of said selected displays after said driver looks away from said selected displays.

19. The apparatus according to claim 1, wherein said eye position information is received from a Driver State Monitoring (DSM) system.

* * * * *